Mar. 27, 1923.
A. W. LE BOEUF
BRUSH MACHINE
Original Filed May 22, 1916    21 sheets-sheet 1
1,449,424
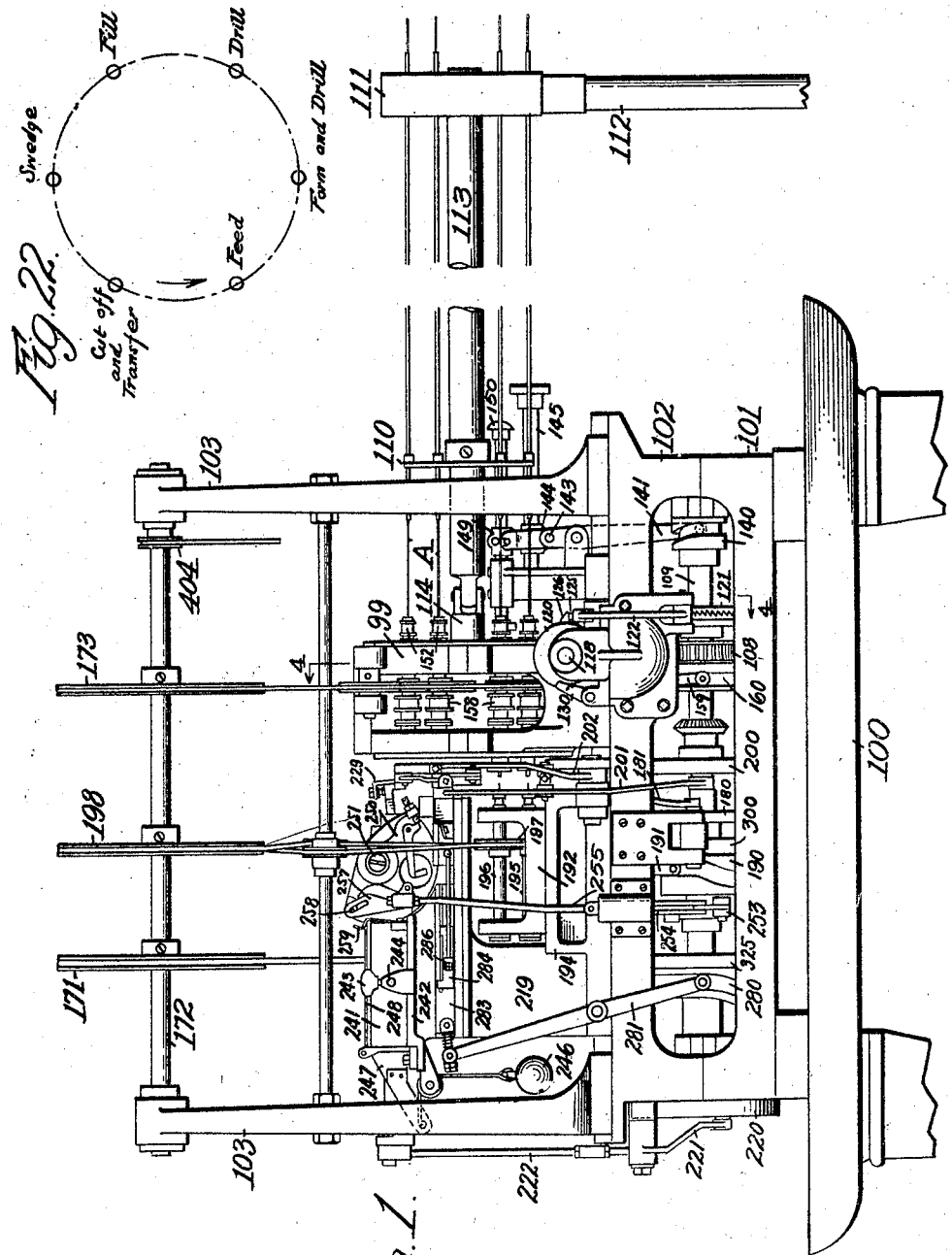

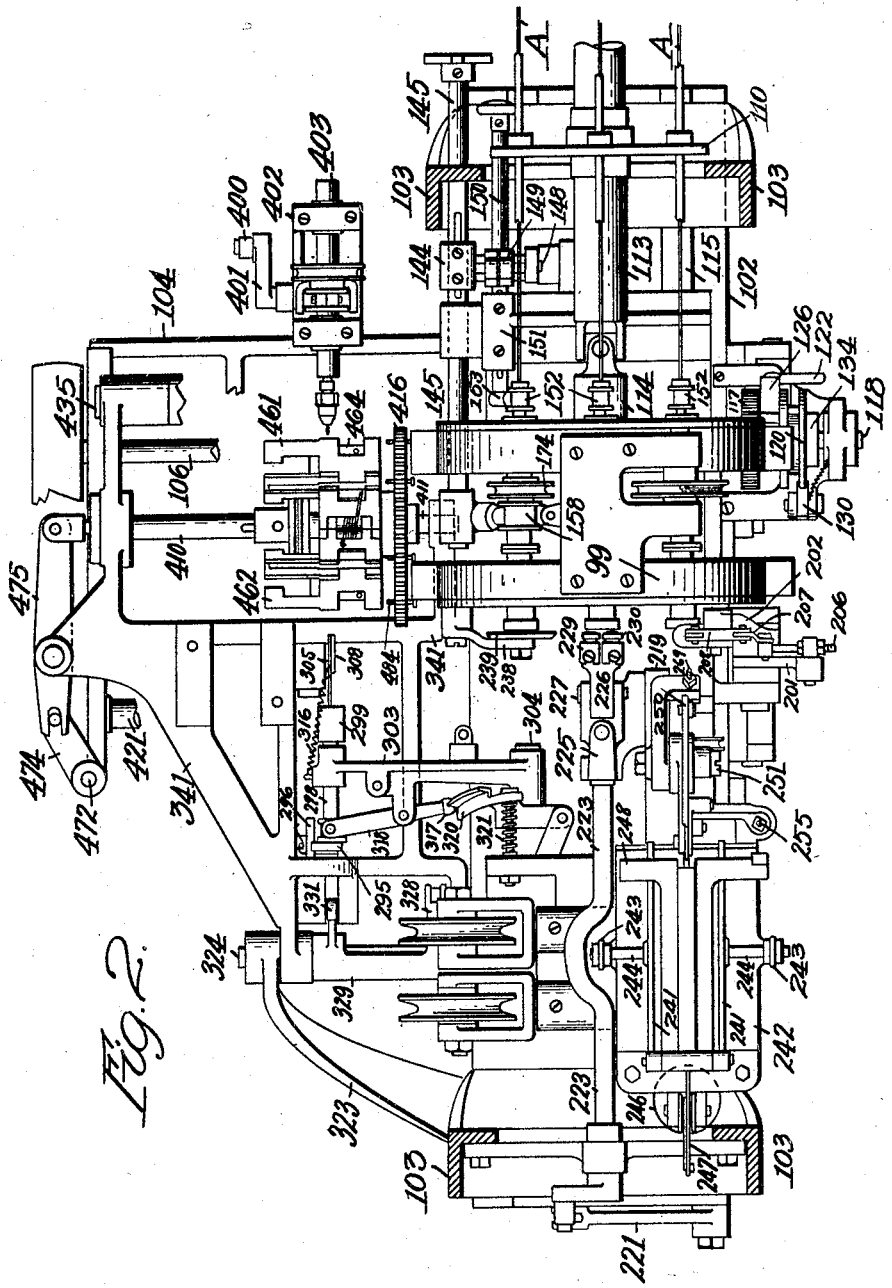

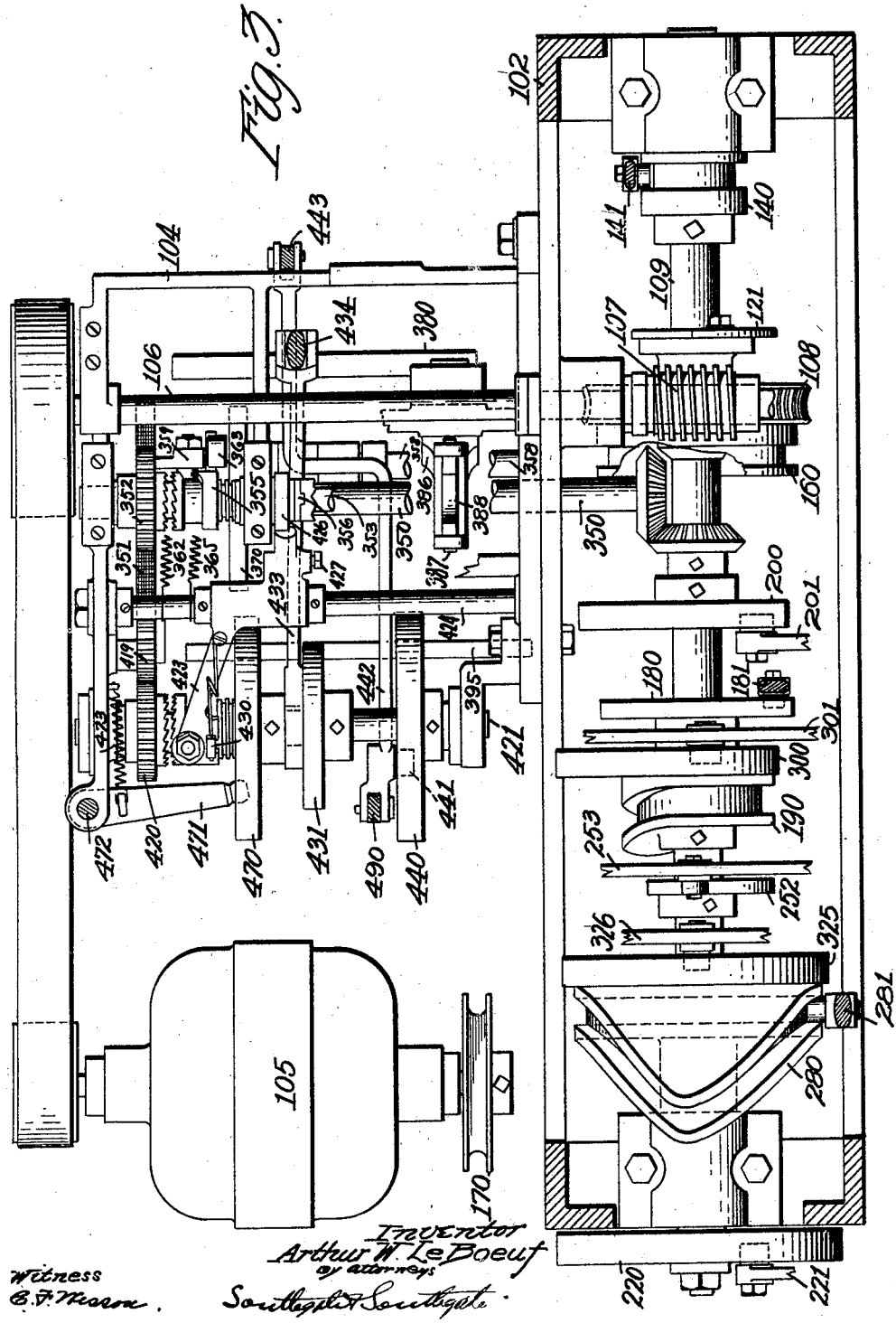

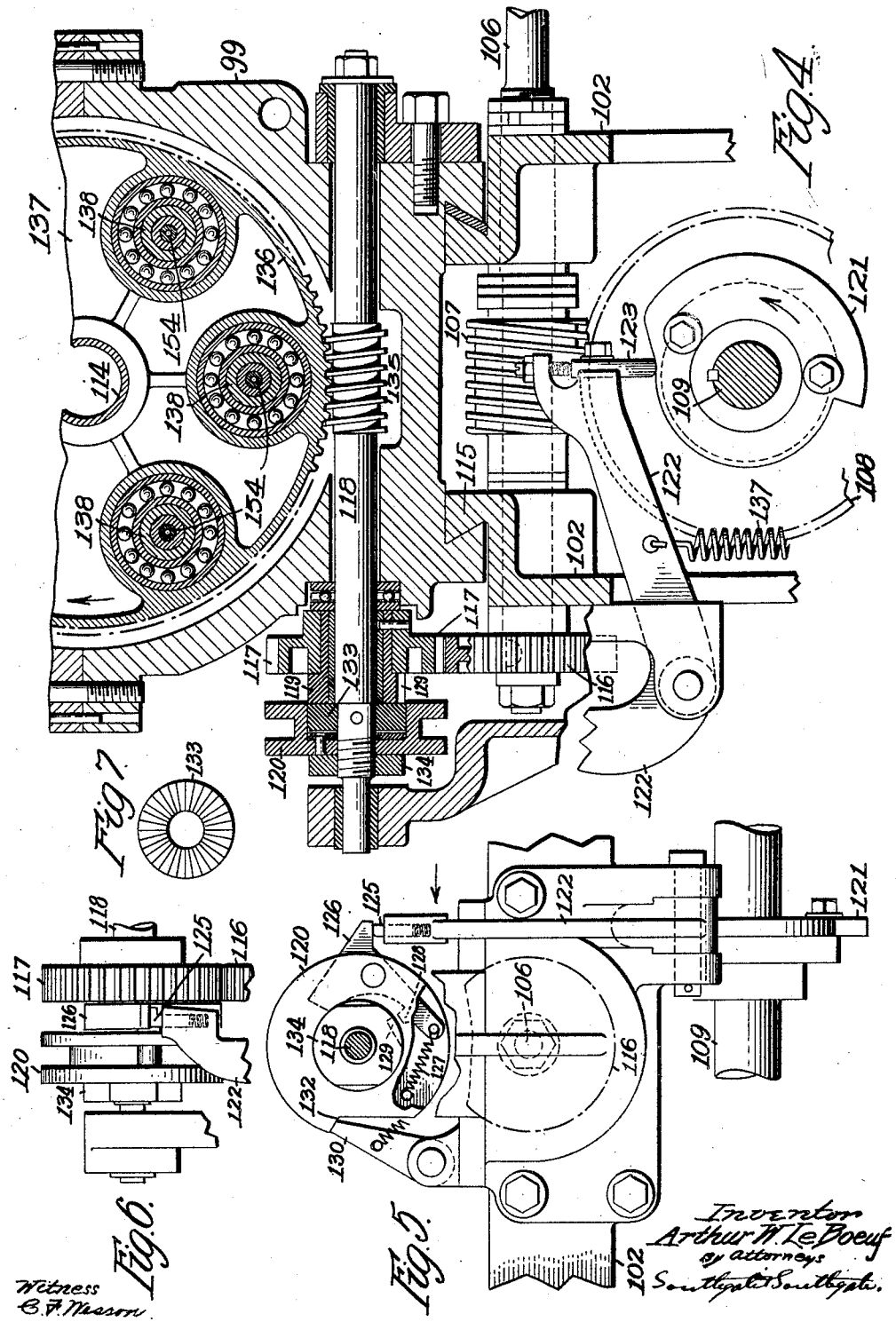

Mar. 27, 1923.

A. W. LE BOEUF
BRUSH MACHINE
Original Filed May 22, 1916

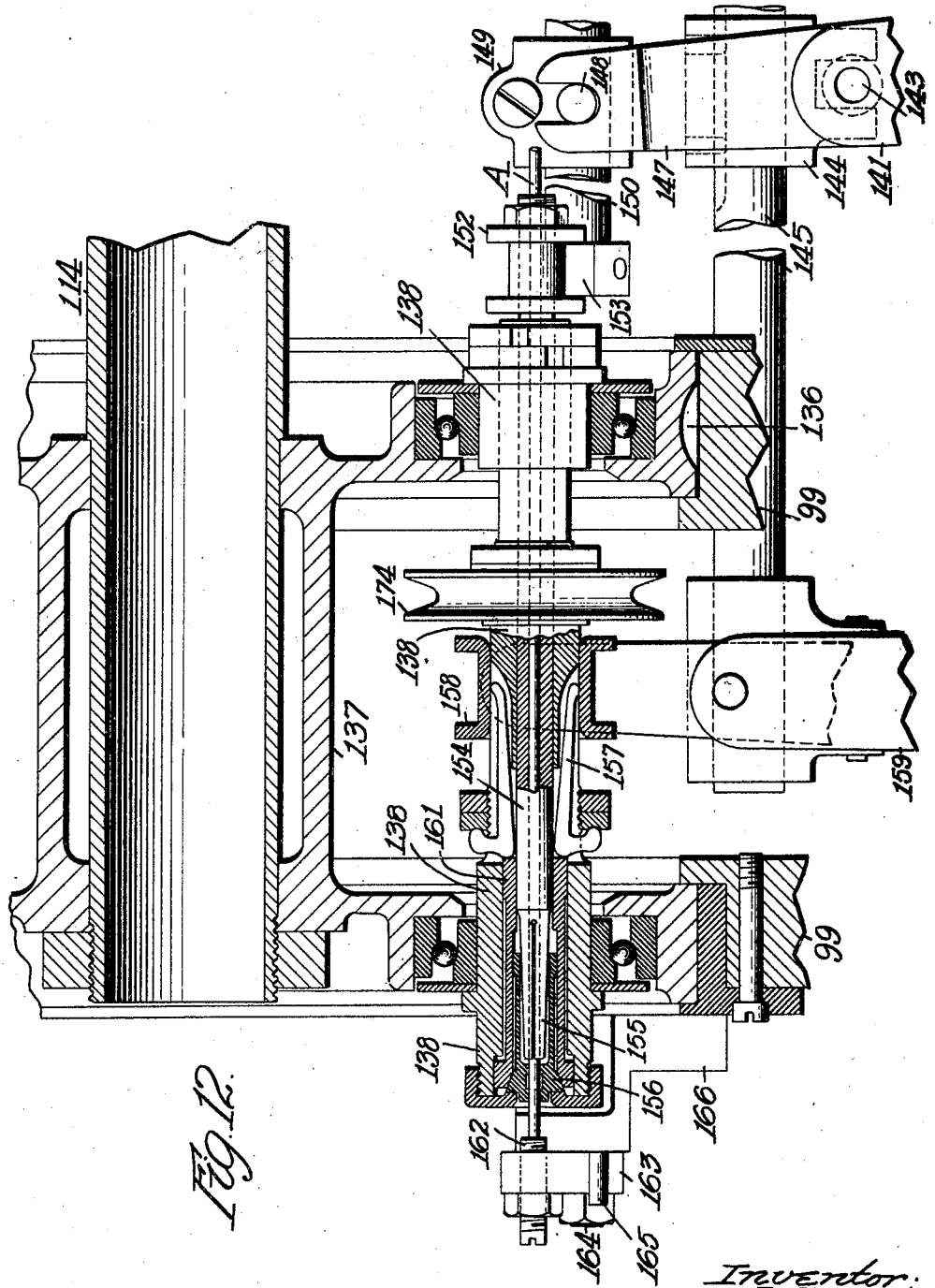

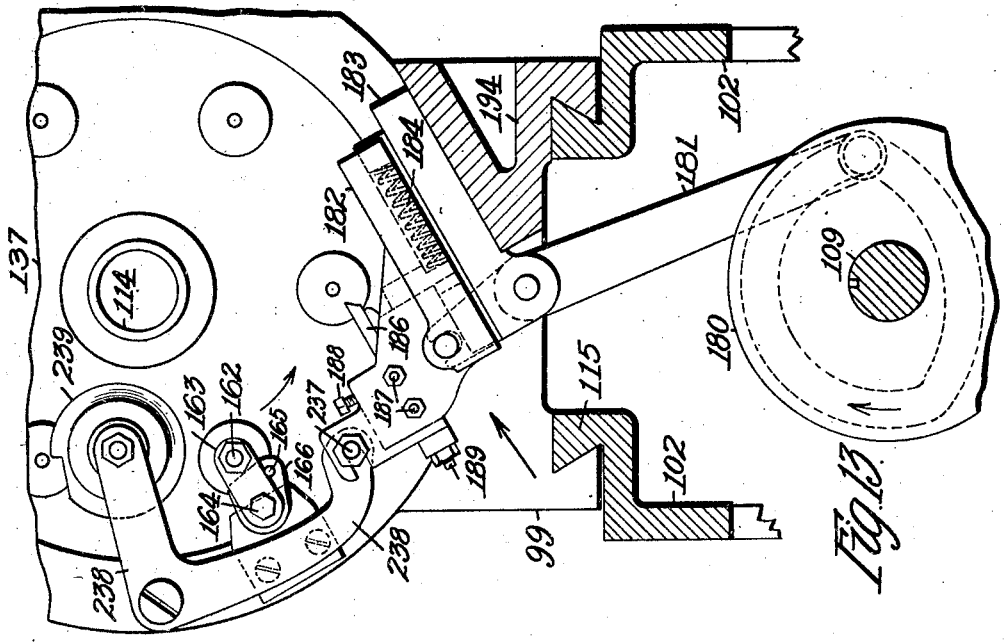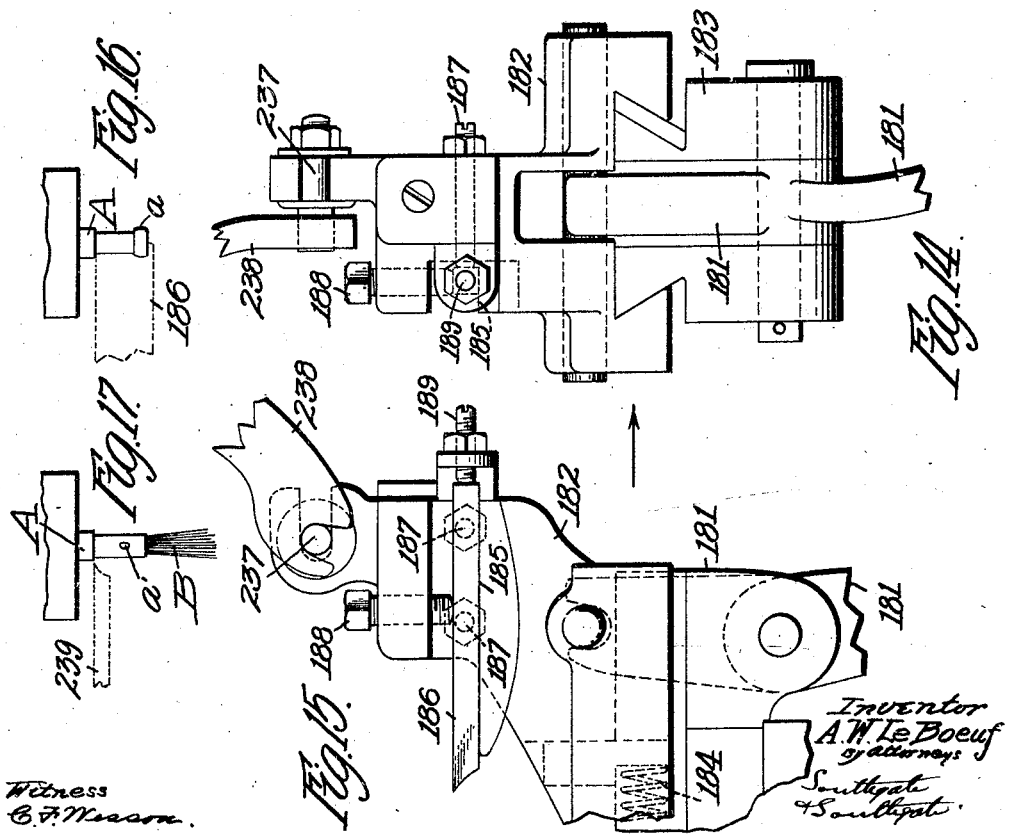

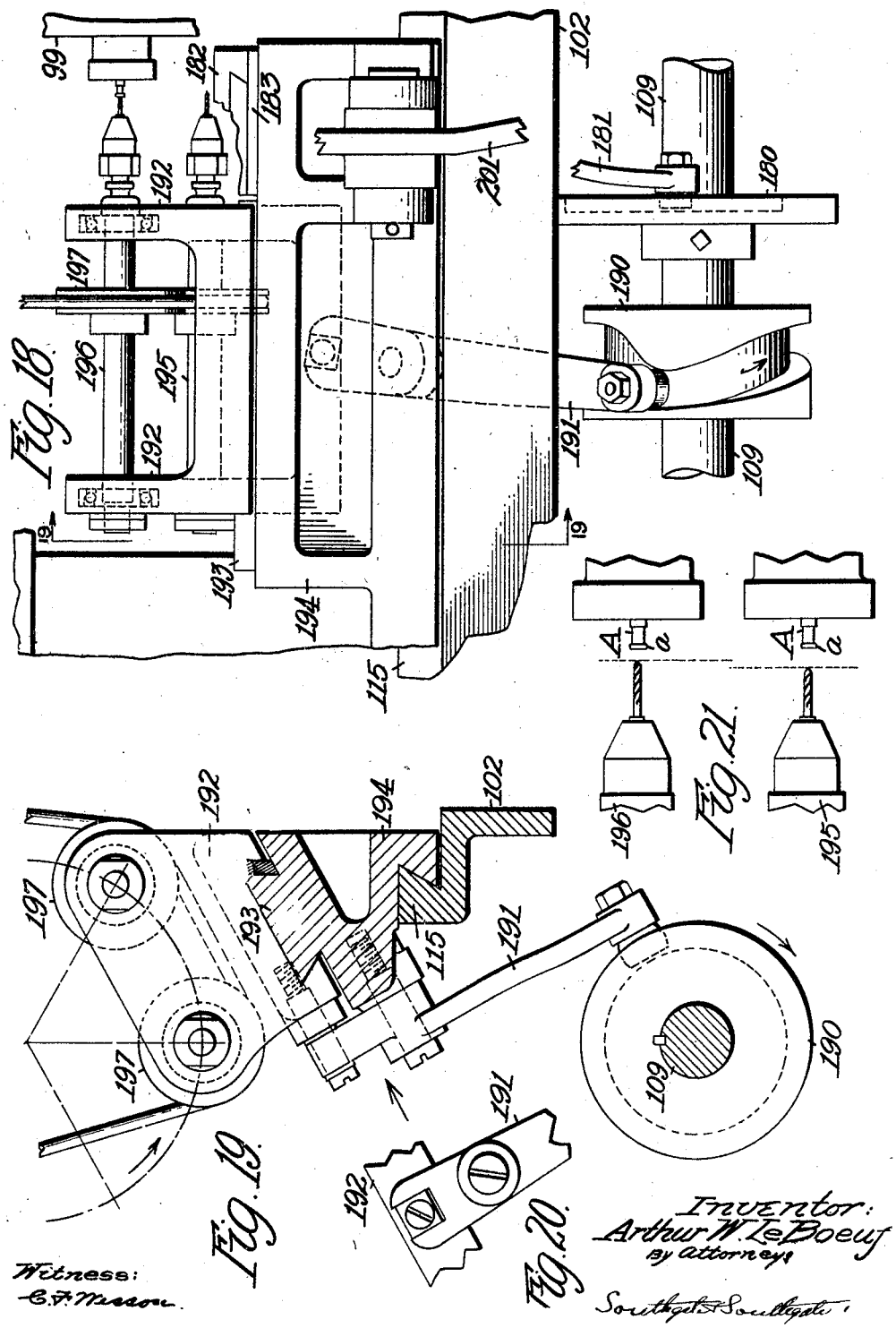

Mar. 27, 1923.
A. W. LE BOEUF
BRUSH MACHINE
Original Filed May 22, 1916    21 sheets-sheet 9
1,449,424
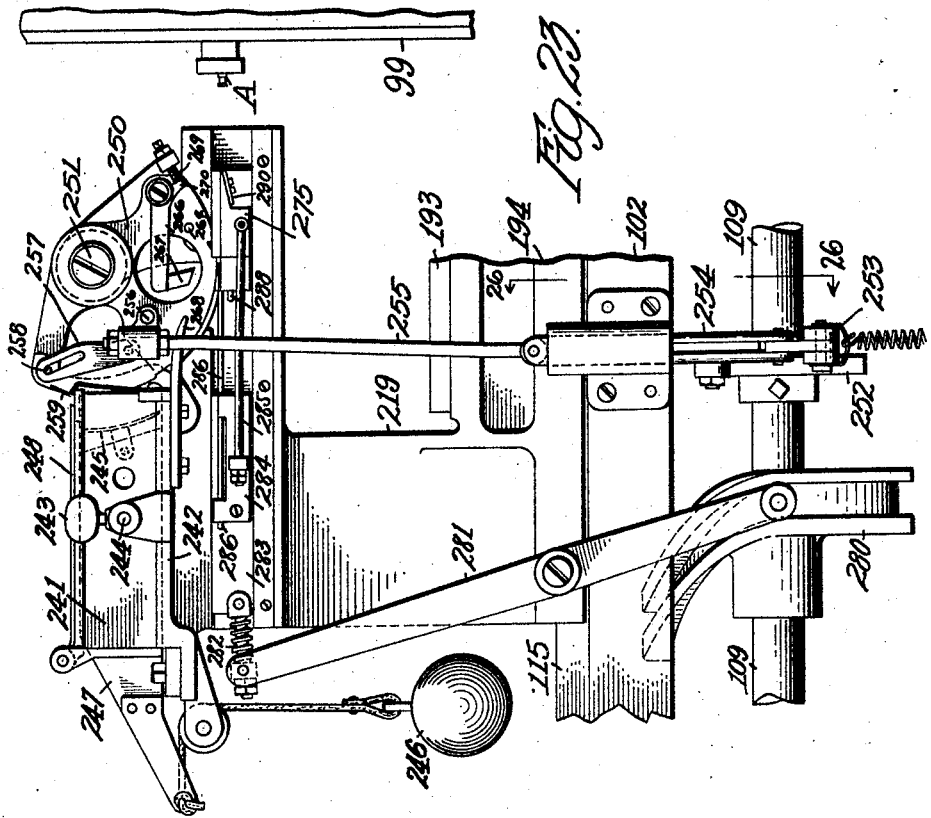
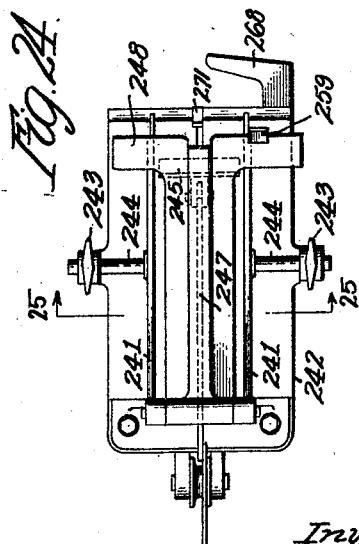
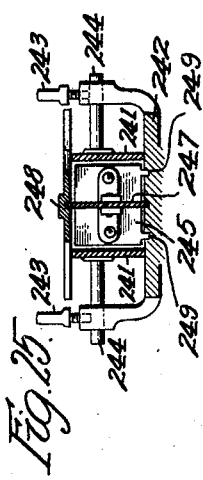
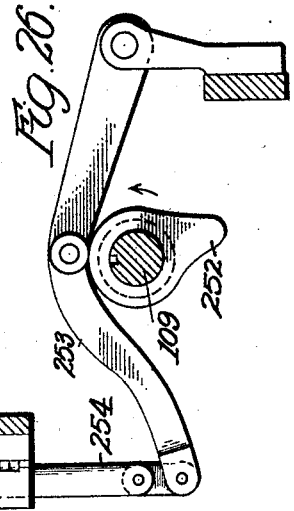
Inventor
Arthur W. LeBoeuf
by attorneys
Southgate & Southgate.
Witness
C. F. Nissen

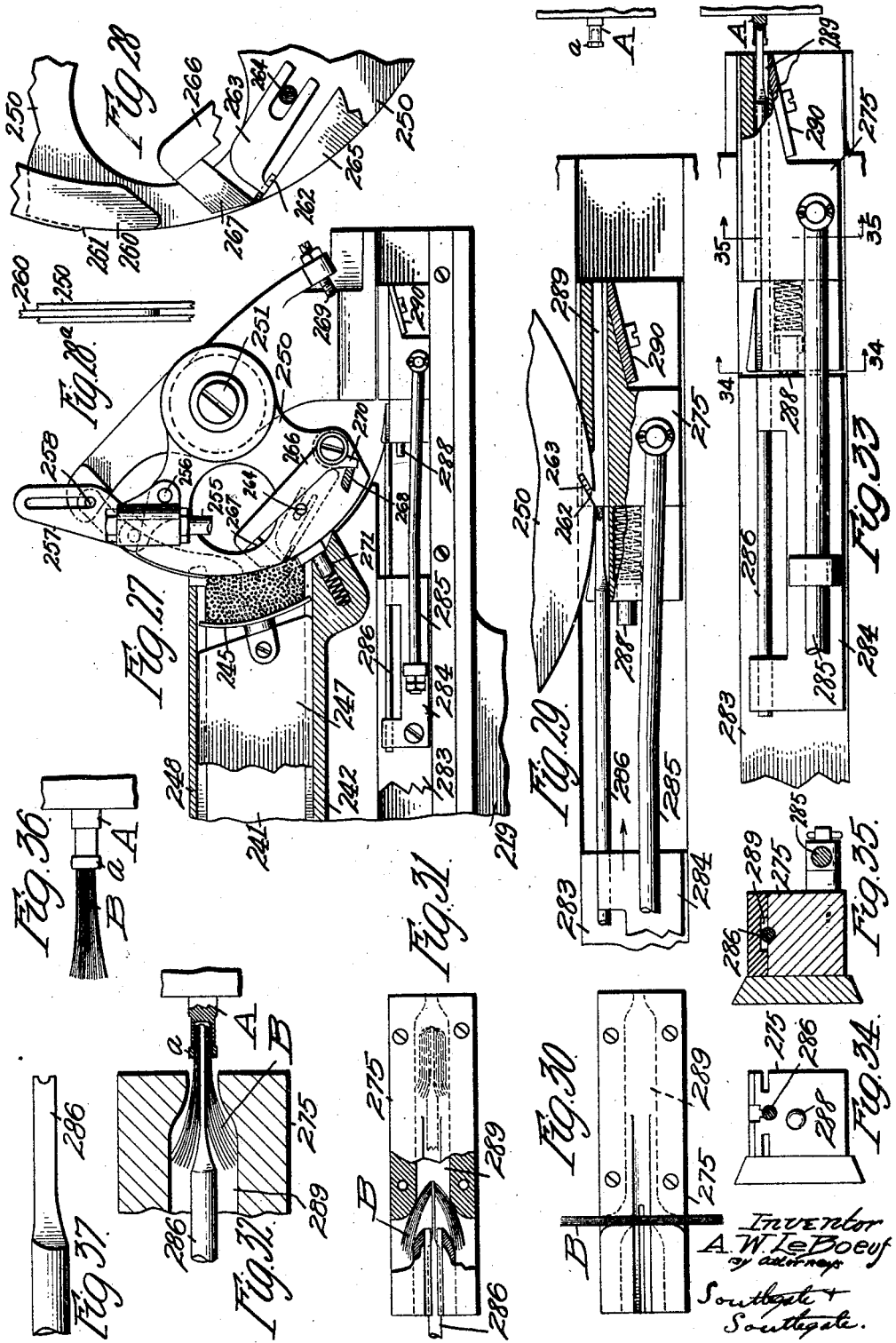

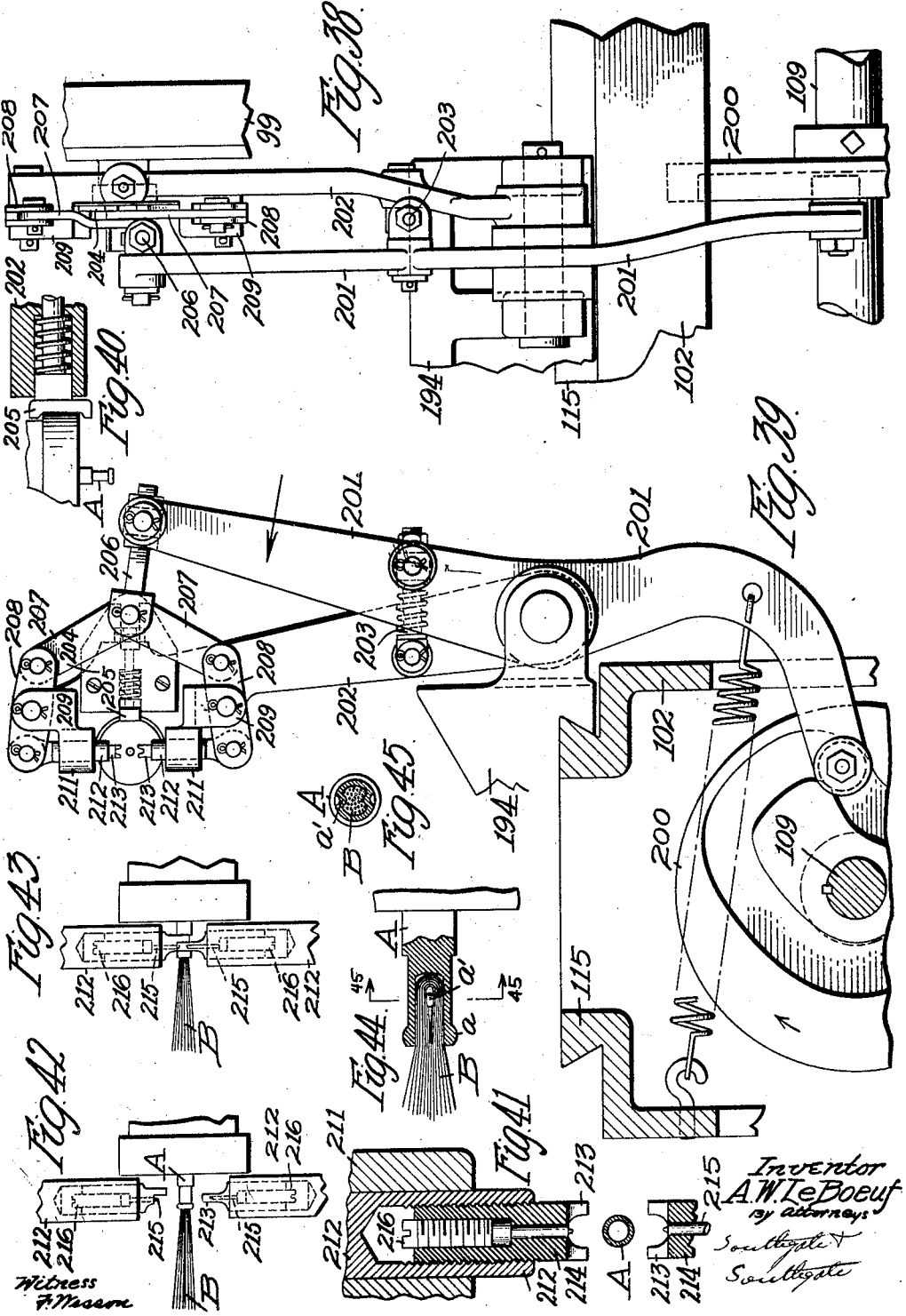

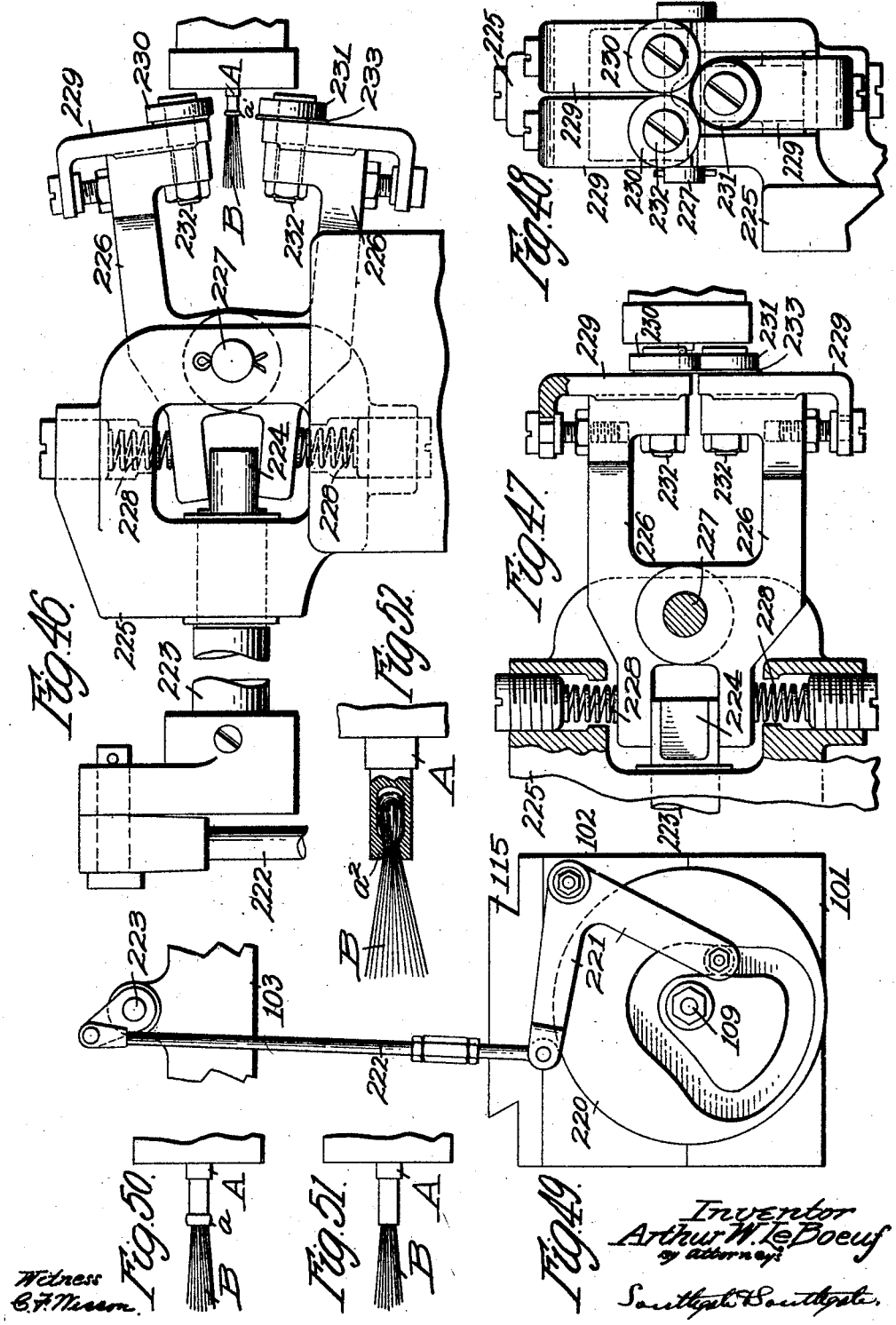

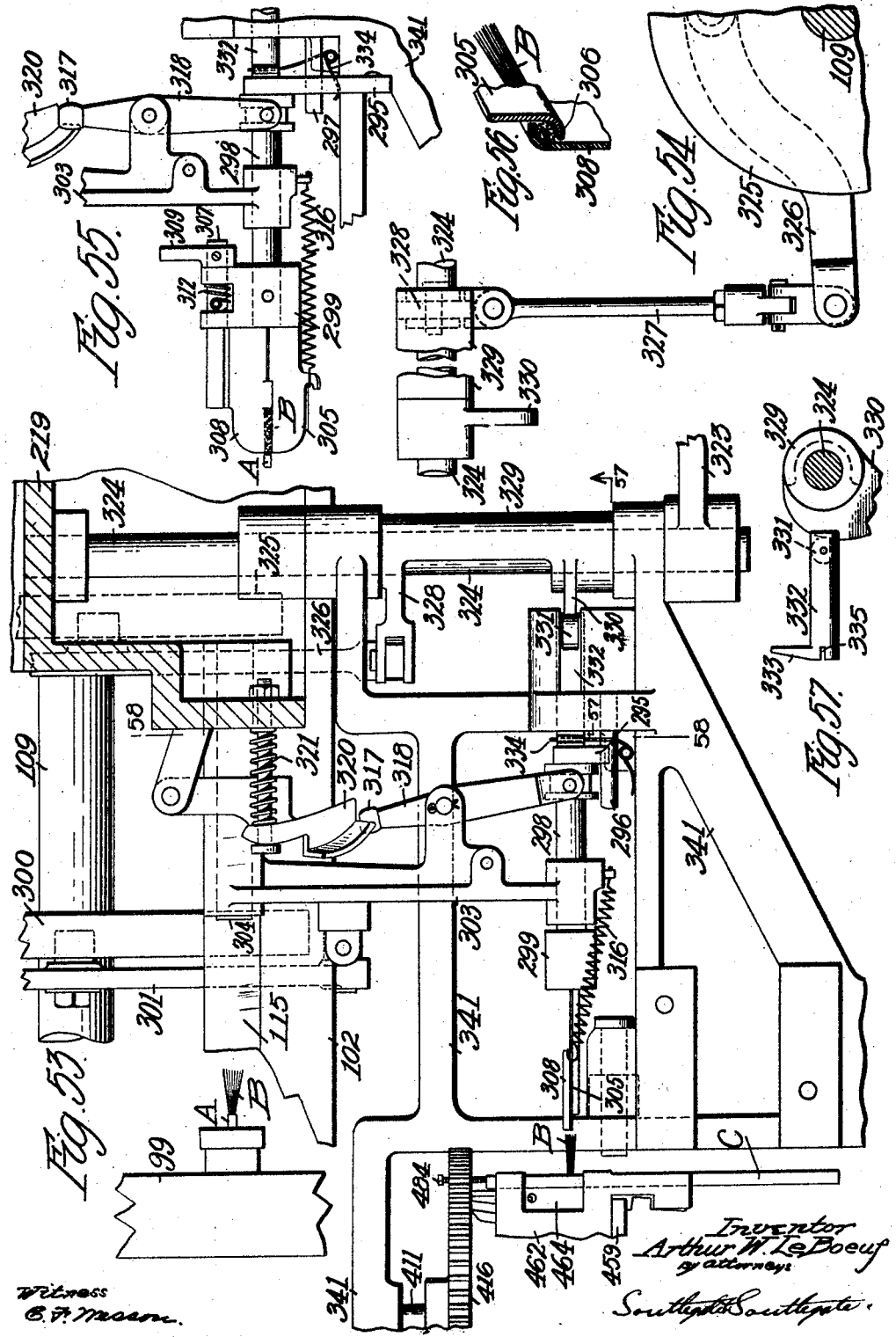

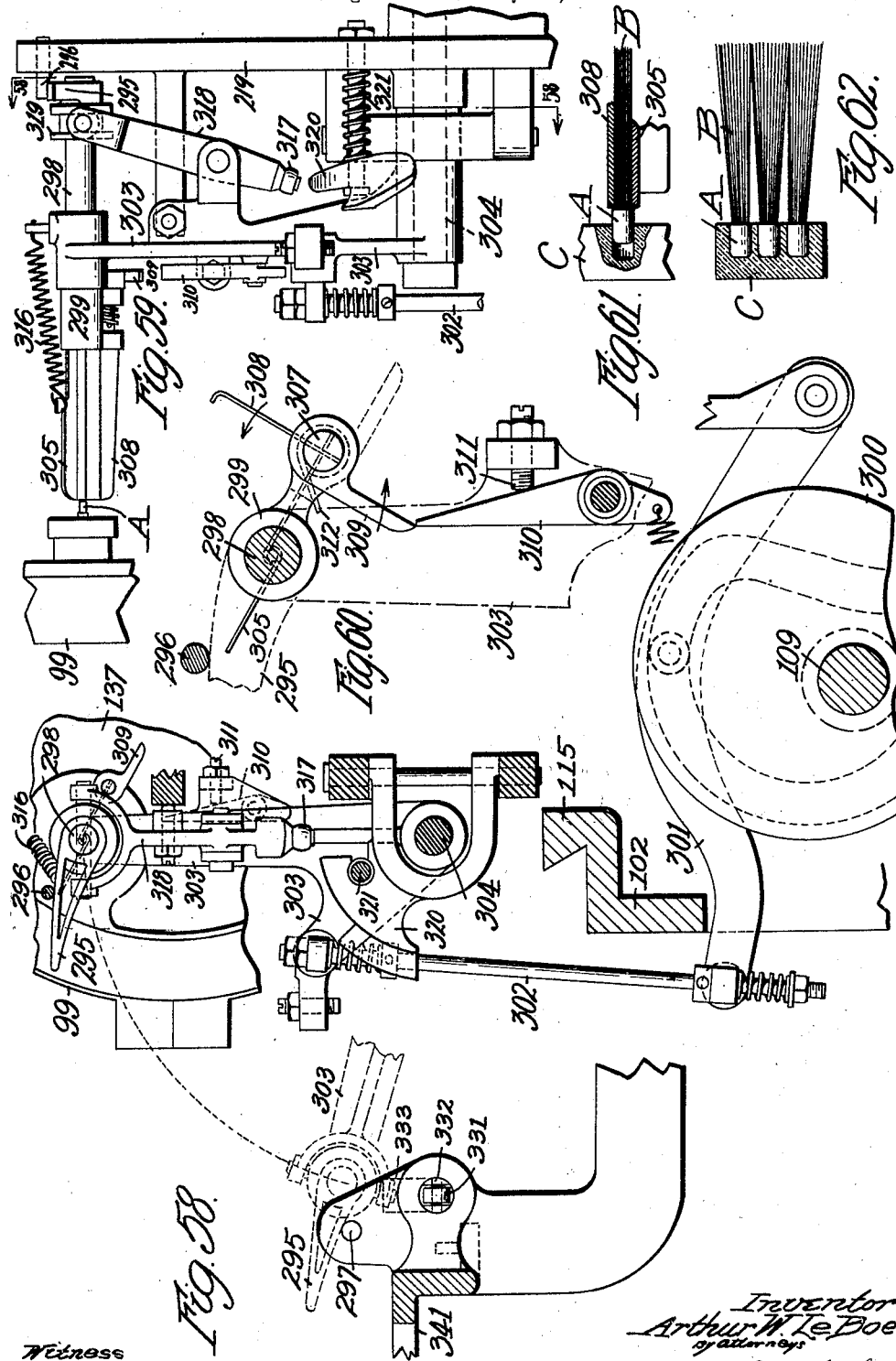

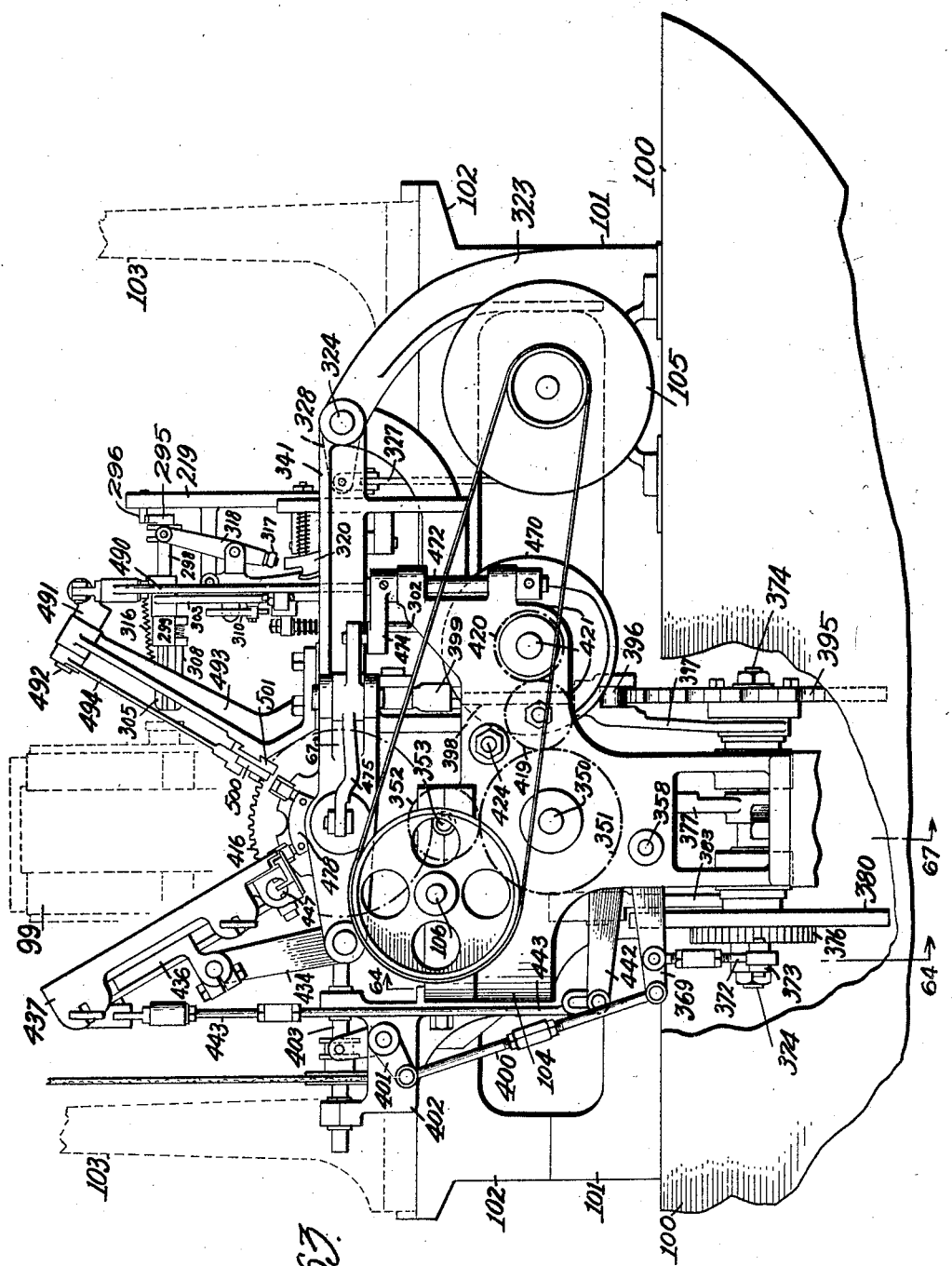

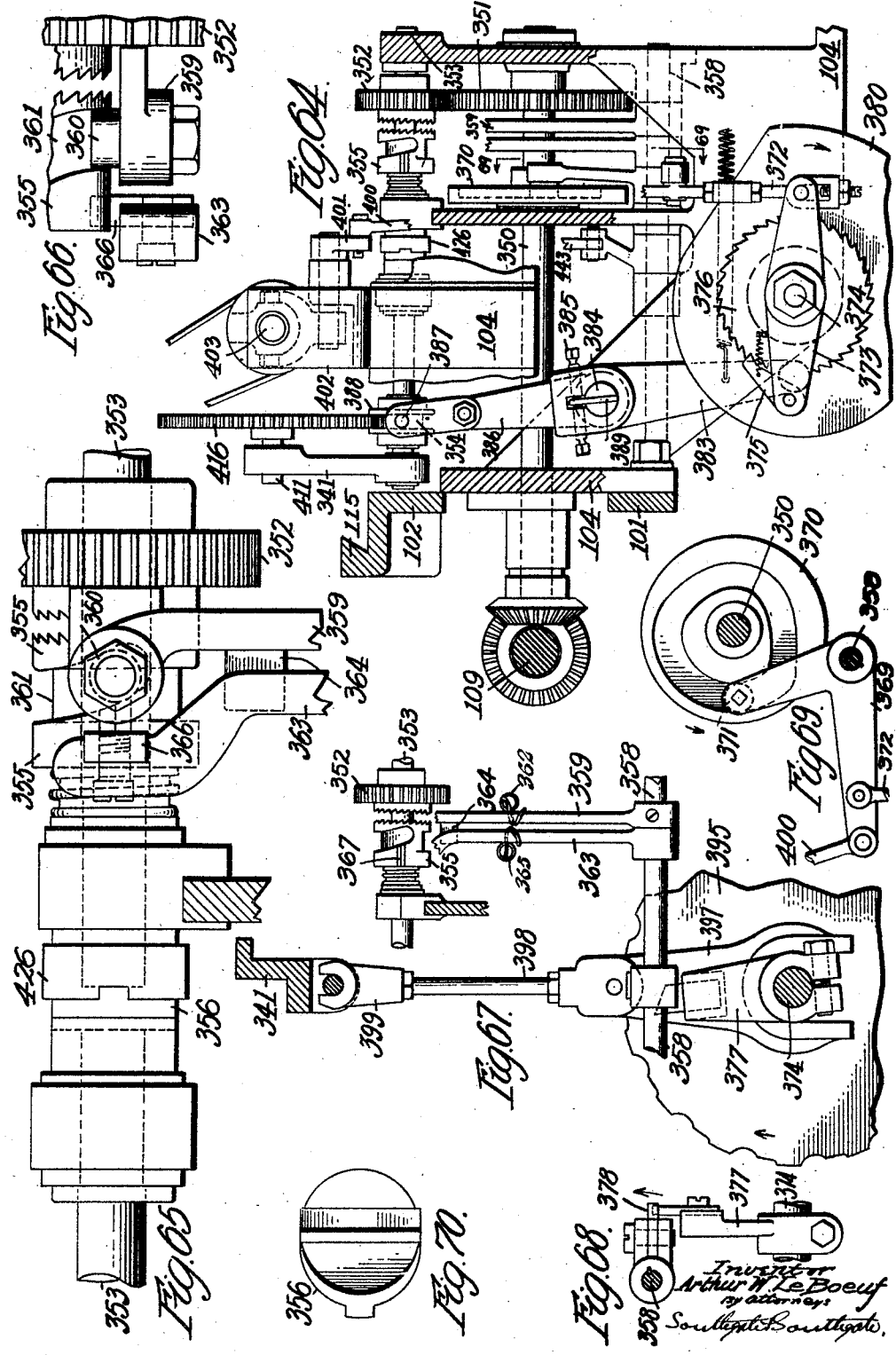

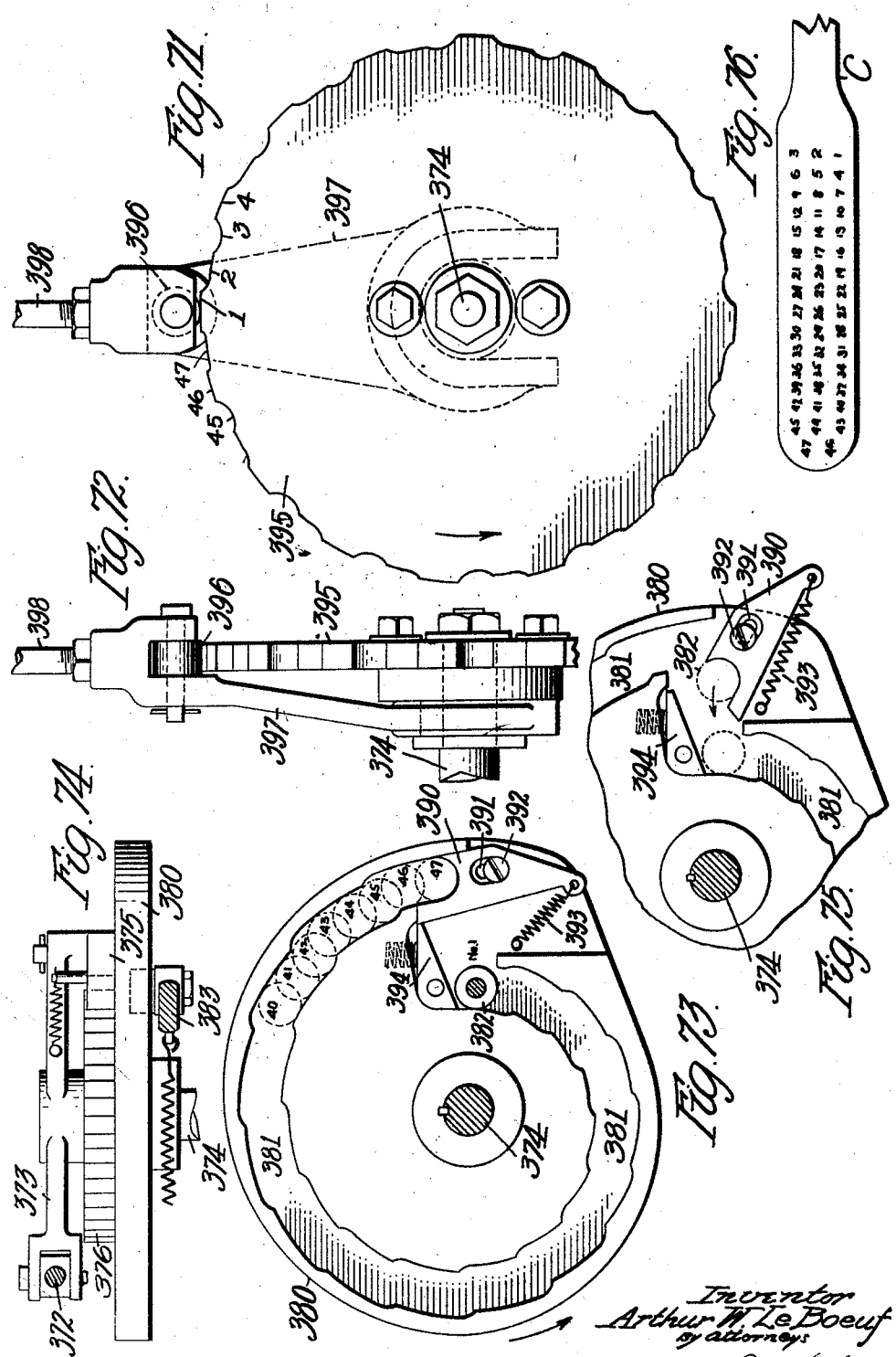

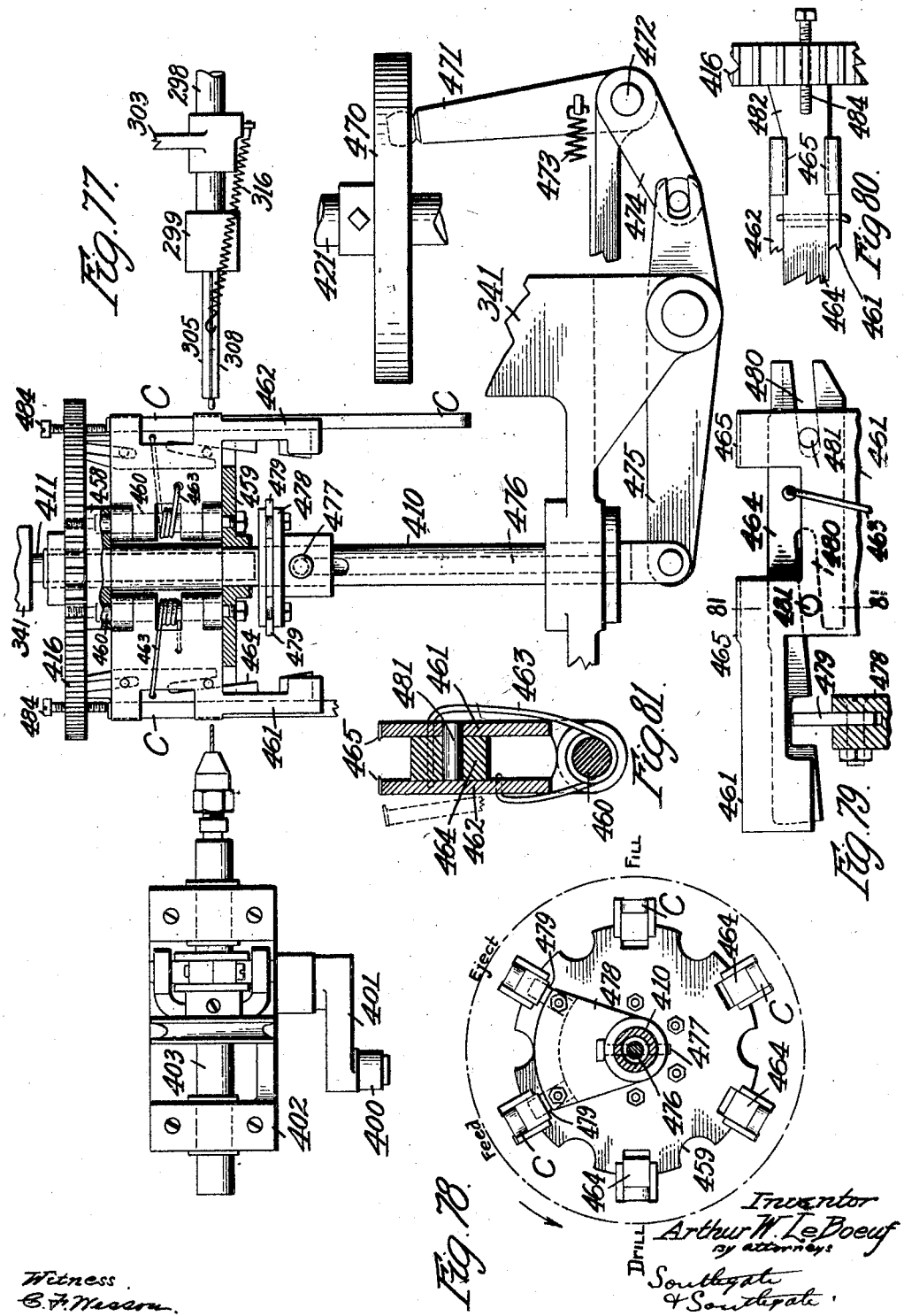

Mar. 27, 1923.
A. W. LE BOEUF
BRUSH MACHINE
Original Filed May 22, 1916     21 sheets-sheet 19
1,449,424
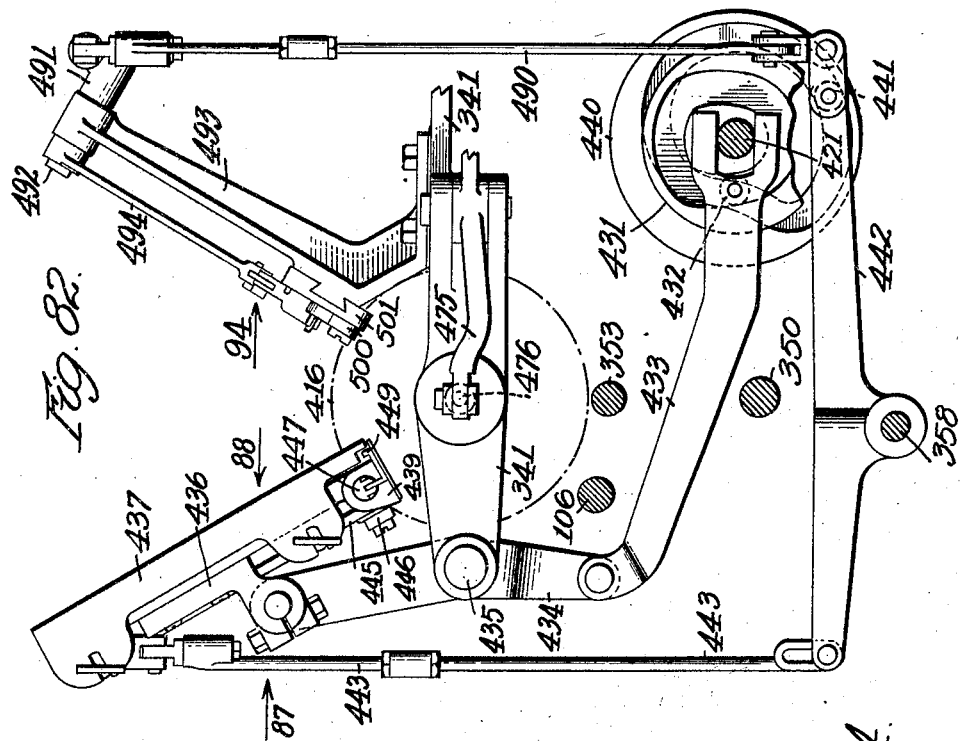
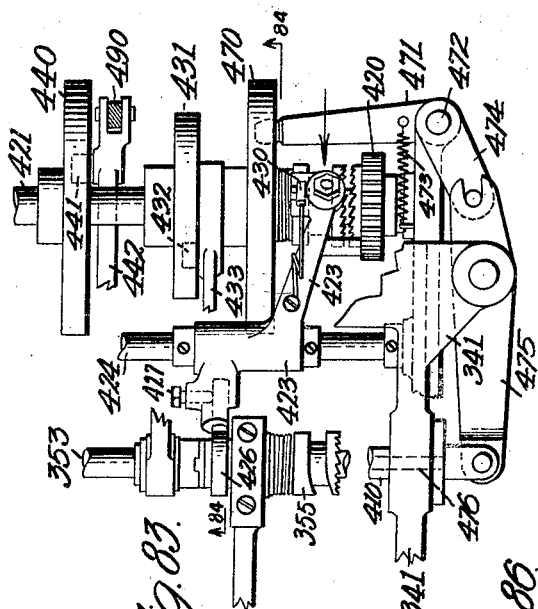
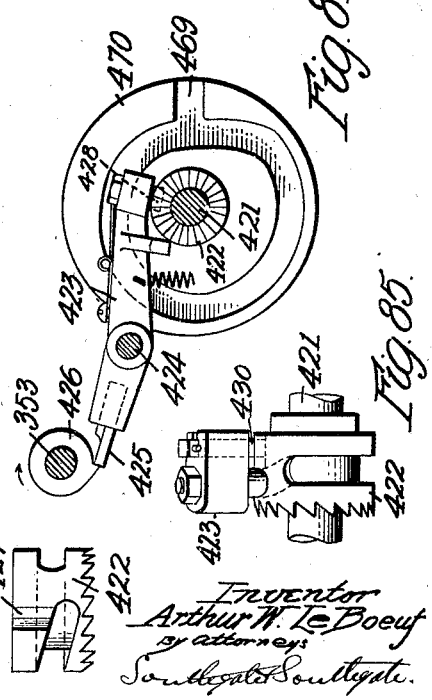
Witness:
B. F. Mason.
Inventor
Arthur W. Le Boeuf
By attorneys
Southgate & Southgate.

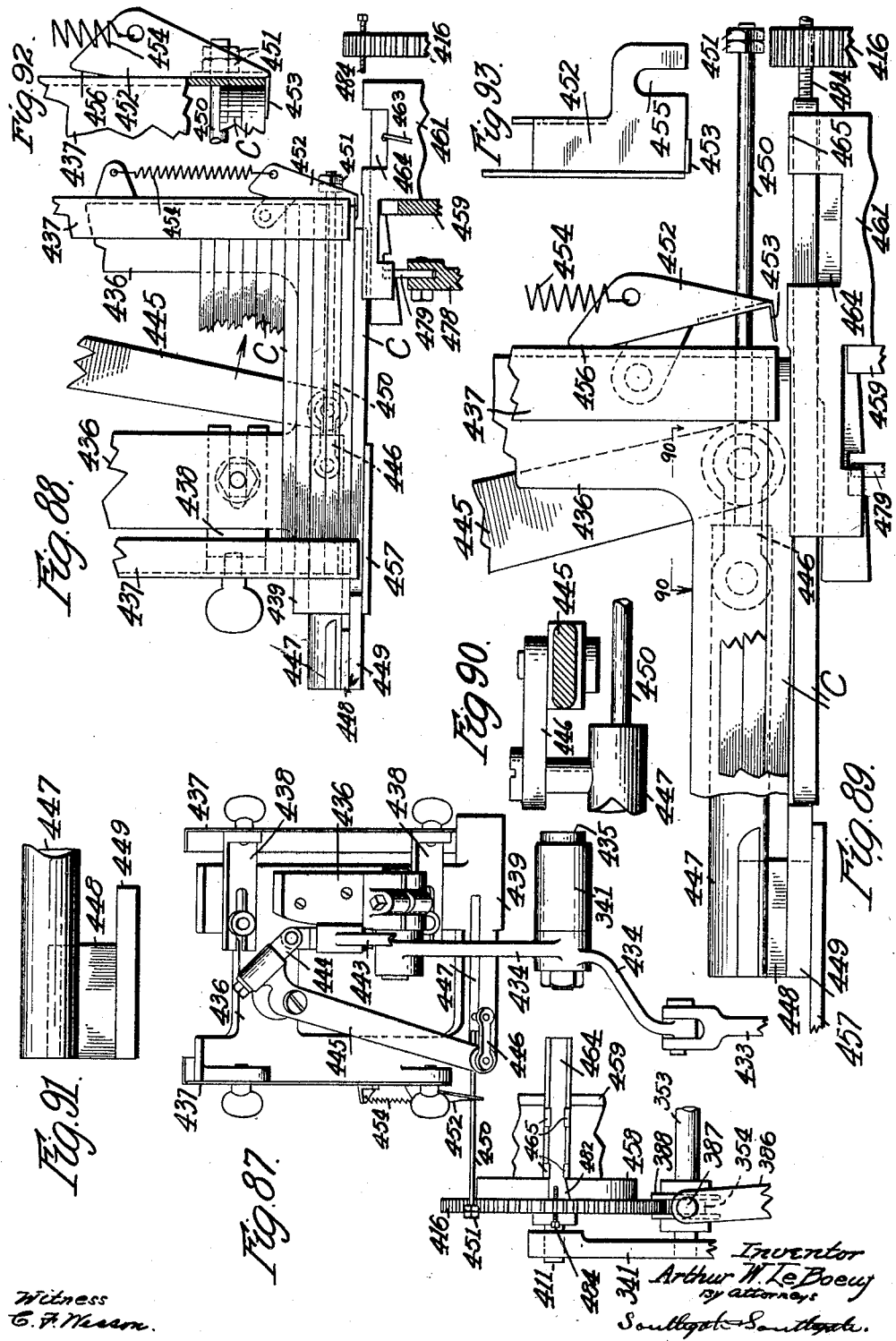

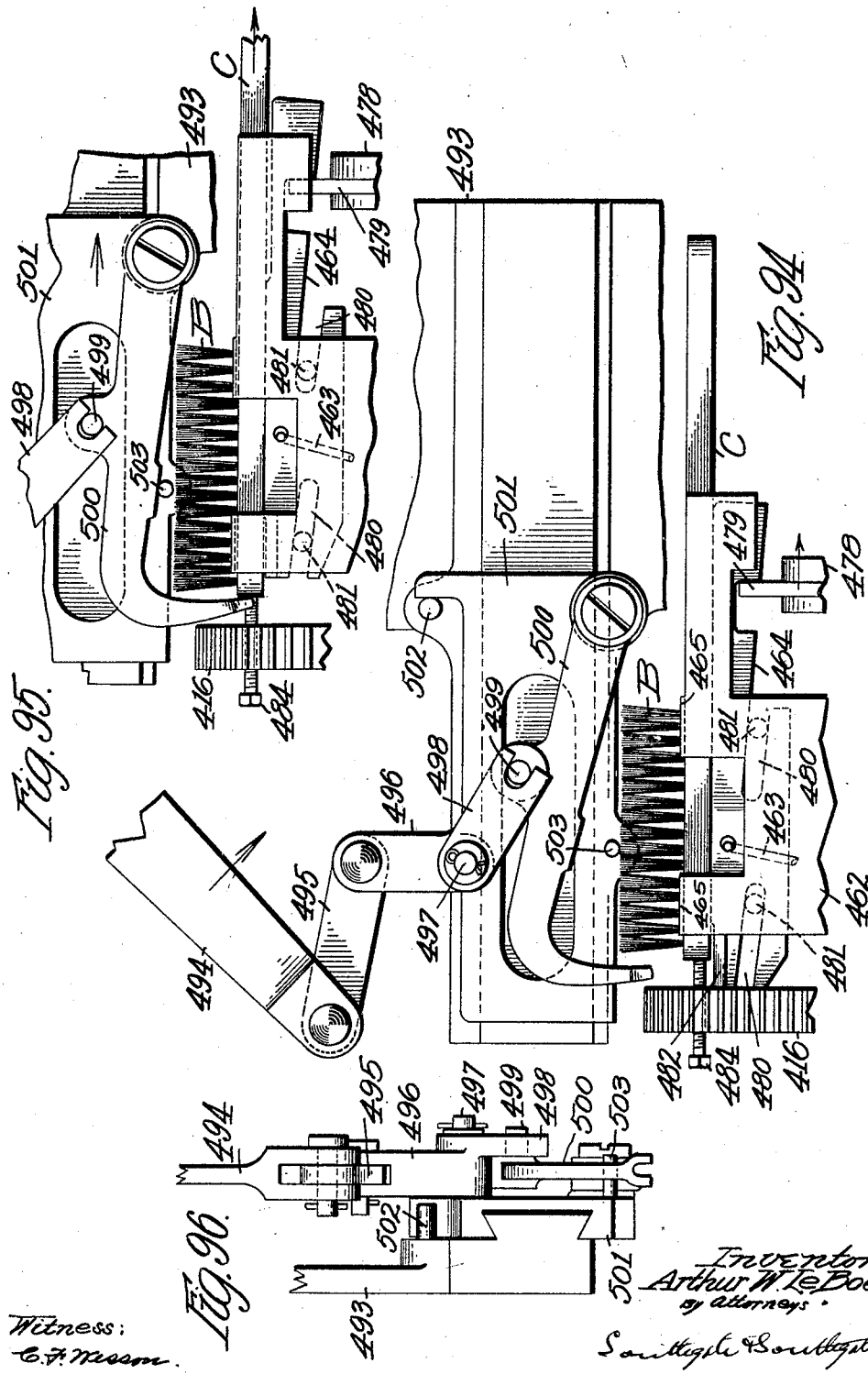

Patented Mar. 27, 1923.

1,449,424

UNITED STATES PATENT OFFICE.

ARTHUR W. LE BOEUF, OF WOONSOCKET, RHODE ISLAND, ASSIGNOR TO MATTHEW J. WHITTALL AND ALFRED THOMAS, BOTH OF WORCESTER, MASSACHUSETTS.

BRUSH MACHINE.

Application filed May 22, 1916, Serial No. 99,100. Renewed March 1, 1921. Serial No. 448,865.

*To all whom it may concern:*

Be it known that I, ARTHUR W. LE BOEUF, a citizen of the United States, residing at Woonsocket, in the county of Providence and State of Rhode Island, have invented a new and useful Brush Machine, of which the following is a specification.

This invention relates to an automatic machine for manufacturing brushes, and more specifically, brushes of the type in which the bristles are first set in cups to form tufts and these afterwards set in the brush blanks.

The principal objects of the invention are to provide a machine of compact form so that the various parts thereof can be mounted on a small frame and take up very little space; which will be capable of manufacturing brushes automatically, that is, taking the bristles from a hopper and feeding them automatically through the machine, applying them to a bristle holding means which is also made automatically on the machine and forming the tufts, then transferring these tufts to another position and applying them to brush handles which are previously formed outside of this machine, but which are drilled and tufted on the machine; furthermore to provide improvements in the bristle feeding and tuft-forming mechanism of such a character that the bristles which are difficult to handle on account of their natural resiliency will be taken up in bunches of definite sizes, fed forward, doubled over so as to form a tuft, and then inserted in a hollow cup; to provide means whereby the said cups are formed from one or more wires in an expeditious and convenient manner; to provide automatic mechanism for forming these cups comprising means for supplying the wire automatically, means for drilling into the end of each of a plurality of wires in regular order, preferably by a plurality of drilling operations, means whereby when the tuft is placed in a cup thus formed, it is temporarily secured therein by an automatic clinching operation, and means whereby the cup is then automatically cut off the wire so as to come through the rest of the operations as a unit separate from the wire; and also more specifically to provide a rotary turret capable of operating on a plurality of wires provided with means for rotating the wires carried thereby on their own axes at certain times during the operation of the said turret, so that the wire itself shall be projected through the turret into a certain position and rotated on its own axis while a forming tool shapes it to a convex form at the end, then indexed around and rotated while an oppositely rotating drill is forced into its end axially, then fed around while still rotating, and its rotation continued during a second drilling operation, then fed around another step and its rotation on its own axis arrested while the tuft of bristles is applied to it, and clinched in its end, the intermittent rotation of the turret being then continued and the rotation of the wire on its own axis being then resumed while the convex end of the wire is forced inwardly to permanently secure the tuft therein, and the portion of the wire constituting the cup with a tuft of bristles therein is cut off; to provide a transferring device for taking the tuft thus produced from the tuft-forming mechanism above indicated and transferring it to a mechanism for setting the tufts in the brush handles; and to provide important features of the said transferring mechanism to cause it to perform its functions; to provide an improved brush-making mechanism in which the brush blanks or handles are automatically fed to an intermittently revolving turret which first turns them to a position in which holes are drilled for receiving the tufts, said holes passing only part way through the brush blank, and then feeds them to a substantially opposite position at which the tufts are inserted in the holes previously formed; to provide improvements in the mechanism for operating the said blank-holding turret, in the mechanism by which the drilling and tufting is performed on the blank while held thereon, in the mechanism by which the blanks are held in the turret and discharged therefrom; in the means for feeding the blanks automatically to the turret and clamping them thereon; and to provide improvements in means for operating and co-ordinating the various parts of the mechanism as above described and in the various details and combinations thereof. Further objects and advantages of the invention will appear hereinafter.

Reference is to be had to the accompanying drawings in which:—

Fig. 1 is a front view of a tooth brush making machine embodying this invention;

Fig. 2 is a plan of the same;

Fig. 3 is a plan of the driving mechanism slightly enlarged showing some elements in section;

Fig. 4 is a sectional view on the line 4—4 of Fig. 1 on enlarged scale showing the wire turret indexing mechanism;

Fig. 5 is a front elevation of a portion of the same;

Fig. 6 is a side view of the upper portion of the same;

Fig. 7 is an elevation of the index clutch;

Fig. 8 is a front elevation of the turret mechanism;

Fig. 9 is a sectional view on the line 9—9 of Fig. 8;

Figs. 10 and 11 are sectional views respectively on the lines 10—10 and 11—11 of Fig. 8;

Fig. 12 is a central sectional view of the turret spindle on enlarged scale;

Fig. 13 is a face view of the turret showing the forming and cutting off mechanism;

Fig. 14 is a rear elevation of the same looking in the direction of the arrow in Fig. 13;

Fig. 15 is an end view of the same looking in the direction of the arrow in Fig. 14;

Fig. 16 is a diagrammatic view showing the operation of the forming tool;

Fig. 17 is a similar view showing the operation of the cutting off tool.

Fig. 18 is a front elevation of the drilling mechanism;

Fig. 19 is a sectional view of the same on the line 19—19 of Fig. 18;

Fig. 20 is a slanting elevation of a portion of the same;

Fig. 21 is an enlarged view similar to a part of Fig. 18 showing the two drilling operations;

Fig. 22 is a diagrammatic view showing the sequence of operations of the wire turret indexing mechanism;

Fig. 23 is a front view of the bristle hopper and feeding mechanism;

Fig. 24 is a plan of the hopper;

Fig. 25 is a sectional view on the line 25—25 of Fig. 24;

Fig. 26 is a detail view of the cam for operating the bristle feeding and connected parts;

Fig. 27 is a longitudinal sectional view of the bristle hopper showing the feeding mechanism in the position in which it has just taken up a bunch of bristles;

Fig. 28 is a similar view of the bristles feeding device on enlarged scale showing it in the same position;

Fig. 28ª is an edge view of a portion of the same;

Fig. 29 is a front elevation of the lower portion of the bristle feeding device shown partly in section and showing the bunch of bristles brought down into position ready for the tuft to be formed;

Fig. 30 is a plan of a portion of the same showing the position of the bristles just before the tuft is formed;

Fig. 31 is a similar view showing in full lines the starting of the formation of the tuft and in dotted lines the tuft forced along to a subsequent position;

Fig. 32 is a similar view on enlarged scale showing the tuft of bristles forced into the cup;

Fig. 33 is a front view showing the parts in the same position;

Figs. 34 and 35 are sectional views on the lines 34—34 and 35—35 of Fig. 33;

Fig. 36 is a side view of the cup with its tuft of bristles located therein;

Fig. 37 is a side view of the needle for forming the tuft;

Fig. 38 is a front view of the nicking mechanism;

Fig. 39 is an end view of the same;

Fig. 40 is a detail view of the bumper for limiting the nicking mechanism;

Fig. 41 is a sectional view on enlarged scale of the nicking mechanism through the center of the nicking head;

Figs. 42 and 43 are two full sized views of the nicking mechanism showing it in two positions;

Fig. 44 is an enlarged sectional view of one of the metal cups showing the tuft of bristles in position and the nick formed therein;

Fig. 45 is a sectional view of the same on the line 45—45 of Fig. 44;

Fig. 46 is a full sized front elevation of the swedging mechanism in open position;

Fig. 47 is a similar view showing it in closed position;

Fig. 48 is an end elevation of the same;

Fig. 49 is an end elevation of the operating mechanism therefor;

Fig. 50 is an enlarged front elevation of one of the bristle cups just before the swedging operation;

Fig. 51 is a similar view after its operation is completed;

Fig. 52 is a sectional view on further enlarged scale showing the bristle cup after the swedging operation is completed;

Fig. 53 is a plan of the transferring mechanism showing the frame in its delivering position and the jaws just retracted after having delivered a tuft;

Fig. 54 is an end elevation of part of the operating mechanism therefor;

Fig. 55 is a view similar to Fig. 53 showing the parts in position about to deliver;

Fig. 56 is an enlarged view showing how the jaws grip the tufts;

Fig. 57 is a sectional view on the line 57—57 of Fig. 53;

Fig. 58 is a sectional view on the line 58—58 of Fig. 53 showing the parts in full lines in the receiving position and showing them in dotted lines in the position shown in Fig. 55;

Fig. 59 is a rear elevation of the same in the position shown in full lines in Fig. 58;

Fig. 60 is a view similar to part of Fig. 58 showing the jaws open in full lines and indicating in dotted lines how they are closed;

Fig. 61 is a sectional view showing the brush blank and illustrating the application of the tuft thereto;

Fig. 62 is a transverse sectional view of the same;

Fig. 63 is a rear elevation of the machine showing the parts for supporting the brush blanks and operating them and also showing the transferring device;

Fig. 64 is a sectional view on the line 64—64 of Fig. 63;

Fig. 65 is an end elevation on enlarged scale of the index clutch shaft, for the handle turret;

Fig. 66 is a plan of the clutch locking mechanism thereof;

Fig. 67 is a sectional view on the line 67—67 of Fig. 63;

Fig. 68 is a rear elevation of the clutch operating mechanism thereof;

Fig. 69 is a sectional view on the line 69—69 of Fig. 64;

Fig. 70 is a perspective view of the universal joint in the index clutch shaft;

Fig. 71 is a face view of the crosswise brush feed cam and connected parts;

Fig. 72 is an edge view of the same;

Fig. 73 is a rear face view of the longitudinal feed cam;

Fig. 74 is a plan of the same;

Fig. 75 is a view of a portion of the parts shown in Fig. 73 but illustrated in different position;

Fig. 76 is a plan of the brush blank showing one way in which the tufts can be set by this machine;

Fig. 77 is a plan of the handle turret showing connected parts, with parts in section;

Fig. 78 is an end view of the same showing the shaft in section;

Fig. 79 is a side elevation of the brush blank holding jaws;

Fig. 80 is a plan of the same showing the index gear;

Fig. 81 is a sectional view on the line 81—81 of Fig. 79;

Fig. 82 is a rear view of the hopper and ejector mechanism with the parts in the same position as in Fig. 63;

Fig. 83 is a plan view of part of the driving mechanism therefor;

Fig. 84 is a sectional view on the line 84—84 of Fig. 83;

Fig. 85 is an elevation looking in the direction of the arrow in Fig. 83 showing the clutch;

Fig. 86 is a view of one of the clutch members;

Fig. 87 is an elevation of a portion of the handle hopper mechanism looking in the direction of the arrow 87 in Fig. 82;

Fig. 88 is an opposite elevation looking in the direction of the arrow 88 in Fig. 82;

Fig. 89 is a similar view on enlarged scale showing the parts in the position assumed after the delivery of a brush handle;

Fig. 90 is a sectional view on the line 90—90 of Fig. 89;

Fig. 91 is a plan of the end of the pusher;

Fig. 92 is an elevation on enlarged scale of the feed finger pawl showing it in the same position as in Fig. 88;

Fig. 93 is an end elevation of the same;

Fig. 94 is an elevation of the ejector mechanism looking in the direction of the arrow 94 in Fig. 82;

Fig. 95 is a similar view showing the parts in different positions, and

Fig. 96 is an edge elevation of the same.

The invention is illustrated in the form of a machine for making tooth brushes in which a base 100 is provided for supporting a main frame of the machine which is shown as consisting of several parts 101, 102, 103, and 104. The motive power for the machine is preferably obtained from a motor 105 which drives a shaft 106. This shaft by means of a worm 107 and worm wheel 108 drives what I call the main shaft 109 running longitudinally of the machine. This shaft operates most of the mechanism connected with the feeding of the bristles and the making of the tufts.

As has been stated the tufts are formed by forcing bunches of bristles into metallic cups, and these cups are made on this machine. For this purpose wires A preferably of aluminum, are supported on supporting reels 110, the end one of which is rotatably carried by a frame 111 supported in any desired way, as for example, by a post 112 extending up from the floor. The details of this reel will not be described as they do not constitute a part of this invention.

Indexing turret for the wires.

These reels are located about a central shaft 113 and are adapted to support several wires while they are fed through a series of heads on a turret which is mounted on a hollow shaft 114 to which the shaft 113 is pivotally connected. This shaft is mounted on a turret frame 99 carried on ways 115 on the frame member 102. The shaft 106 is provided with a gear 116 fixed thereon which meshes with a gear 117 loose on a shaft 118 parallel with the shaft 106. Rotatable with this loose gear 117 is a hub 119. In the form shown the shaft 106 and also the gear 117 makes eighteen revolutions to one of the shaft 109. On this shaft 109 is an indexing cam 121 which operates an indexing lever 122 provided with an adjustable and removable shoe 123 for engaging the cam and receiving its motion from it. This lever is provided at its outer end with a second removable and adjustable shoe 125 which stops a pawl 126 that is pivoted on the clutch member 120. A spring 127 normally holds this pawl back in a position in which a tooth 128 thereon engages in a notch 129 on the hub 119. This is the position of the pawl while this member rotates. When it rotates around to the point shown in Fig. 5 the end of the pawl engages the shoe 125 and it is caused to swing into the position shown in Fig. 5. At the same time a latch 130 pivoted on the frame engages behind a tooth 132 on the clutch member 120 and positively prevents it from rotating backwards.

The rotation of the clutch disc 120 causes the rotation of the shaft 118 through the other clutch section 133 which is fixed on this shaft. 134 indicates an adjusting nut for disconnecting the clutch sections.

The operation is very simple. The gears 116 and 117 together with the hub 119 are rotating constantly, but inasmuch as the shoe 125 holds the pawl 126 in the position shown in Fig. 5 this rotation of the hub 119 is idle while the shoe 123 is on the low part of the cam 121. When it passes off this part to the high part of the cam the shoe 125 is drawn out from under the pawl 126 to the left in Fig. 6 and the spring 127 draws that pawl in so that on the next revolution of the hub 119 the notch 129 will engage the tooth 128 and cause the disk 120 on which the pawl 126 is pivoted to rotate with it. It will rotate as many times as the cam 121 provides for. In the present instance this cam is so designed as to give it nine complete rotations. Before the ninth rotation is completed the shoe 123 drops off the high part of the cam and the spring 137 brings the shoe 125 over into the position shown in Figs. 5 and 6 so that just as that revolution is completed the tooth 128 will be drawn out of the notch 129 and the hub 119 will continue to rotate idly. By this arrangement it will be seen that the shaft 118 will necessarily rotate exactly one or more complete revolutions.

This rotation of the shaft 118 operates through a worm 135 to drive a wheel 136 on the exterior of the wire turret 137 which rotates on the shaft 114. It will be understood of course that this turret is provided with a plurality of ball-bearing heads 138 each pair designed to hold the wire while some operation is being performed upon it. Figs. 8 to 12.

Wire feed.

The first operation, of course is to draw the wire into the head and that is performed in the following way. On the shaft 109 is a feeding cam 140. This operates a lever 141 which may be all in one piece, but is shown as having behind its short arm an arm 142 pivoted on the pivot stud on which the lever swings. Into this arm 142 extends a pin 143 adapted to be operated by the oscillation of a collar 144 fixed on a rod 145 having a head on it for manual manipulation. This pin is normally pressed in by a spring 146 so that its end enters a socket in the short arm of the lever 141 and under normal conditions this lever operates like any other lever. The arm 142 necessarily works with the lever under these conditions, but in setting the machine up if it is desired to disengage the lever 141 from the parts which it operates the shaft 145 is oscillated to pull out the pin 143 and then the arm 142 and lever 141 can be operated independently and the former moved for adjustment or for hand feeding. This arm 142 is provided with a yoke 147 which receives trunnions 148 on a collar 149 mounted on a feed lever rod 150. This rod is adapted to reciprocate in its bearings 151 and is reciprocated by the operation of the cam 140.

Connected with each one of the turret heads 138 and projecting from the end of the turret is a double collar 152. These collars are of course rotatable with the turret and the feed lever rod 150 is provided with a radially projecting operating end 153 which can be moved by the reciprocation and oscillation of this rod into a position to come between them as they come around into the proper position. The turret stops in such position each time that one of these double flanged collars is in engagement with the feed lever rod end 153 and consequently is under the control of the same. It is at this time that the cam 140 operates this rod. The operation is a mere reciprocation and through the instrumentality of a chuck a wire A which extends through the head is operated. Assuming the parts to be in the position shown in Fig. 12 the collar 152 is drawn back to the right. This draws with it a hollow shaft 154 on which this collar is mounted which draws back a well-known form of split friction clutch jaws 155. These slide along the wire which is now held positively in its original position by means of positive clutch jaws 156. These are operated by clutch levers 157 under the control of a collar 158 which in turn is operated by a lever 159 from a clutch cam 160. The conical surfaces between the jaws 156 and an intermediate sliding member 161 (operated by the levers 157) are responsible for this action. The jaws 155, having been drawn back to the extreme end of the stroke, start forward immediately after the collar 158 is moved to the left far enough to release the ends of the clutch levers 157, and therefore the friction jaws 155 move the wire forward to the left in this figure. It will be understood that in the position in which this operation has been assumed to start the wire between the end of the clutch and the screw stop 162 has been removed by means to be described hereinafter. Therefore the forward movement of the jaws 155 pushes the end of the wire up against this stop and they have sufficient movement to make sure of accomplishing this result, but as they grip the wires frictionally only they may have an excess of that movement. As they stop moving forward the collar 158 moves again to the right and the wire is clutched positively in position by the jaws 156. I do not claim herein the details of this clutch as it does not constitute a part of this invention.

It is to be noted that the lever 159 is shown in Fig. 9 as provided with mechanism like that of the lever 141 for the same purpose. When the rod 145 is turned to withdraw the pin 143 it also withdraws a similar pin 143ª and frees the collar 158.

The stop pin 162 is mounted on an arm 163 which is adapted to swing on the center of a bolt 164. (Fig. 13). It is normally held down by gravity against a pin 165 mounted on a stationary member 166. Therefore if it is desired to take short ends of wire out of the jaws it is convenient to swing this stop up out of the way so that the wire can be pulled or pushed through.

All the wires carried by the reels 110 rotate intermittently with the turret. The feeding position of the turret is indicated in Fig. 22 and the operations to be performed in the other positions which the turret occupies are also indicated in that figure.

On the motor 105 is another pulley 170. This drives a belt which through a pulley 171 drives a shaft 172 carried by the part 103 of the frame. On this shaft is another pulley 173 which is provided with a belt that contacts with several pulleys 174 each one fixed to one of the hollow heads 138 which rotates the wire A held thereby. It is to be noted that the belt which operates these pulleys 174 extends around them in such a way as to engage them in all their positions except one, (see Fig. 9). The reason for this will appear later, but it will be obvious that in all other positions these pulleys, and consequently, the wires which they control, are rotated constantly on their own axes independently of the indexing of the turret.

Cup forming.

As the turret rotates away from the feed position as indicated in Fig. 22 the wire moves downwardly to the position indicated in that figure as "form and drill." This is the lowest position and in that position the mechanism is designed in the present case to perform a shaping operation on the projecting end of the wire and to drill axially into it. This shaping mechanism is actuated by a cam 180 on the shaft 109. This cam by means of a lever 181 reciprocates a tool holder slide 182 movable in ways on a stationary member 183 on the turret frame 99. A spring 184 moves and normally holds the tool holder slide back from the work and the cam positively moves it upwardly to the right in Fig. 13. This slide is provided with a rest in the form of a surface 185 for a cutting tool 186. Extending in through the body of the slide are shown two screws 187 which are adapted to be adjusted to form surfaces for the tool to engage on that side. A binding screw 188 is shown for holding the tool down on the surface 185 and an adjusting screw 189 for controlling its adjustment longitudinally. The reciprocation of this tool toward and from the work as indicated in Fig. 13 is accomplished in this manner and the tool is designed to cut the blank A into the form shown in Fig. 16 so as to reduce its neck and produce a convex circumferential projection a at its end.

Drilling.

While this operation is being performed the first drilling operation also takes place. On the shaft 109 is a drill cam 190 operating a lever 191 which moves a slide 192 in ways 193 on an adjustable table 194 located in ways on the frame 102. On this slide is carried a drill head carrying two drill spindles 195 and 196 as shown in Figs. 18 to 21. Each of these spindles is provided with a pulley 197 and these pulleys are constantly operated from the shaft 172 by a belt passing over them and over a pulley 198 on this shaft. the drilling operation is shown more especially in Fig. 21 and in that case the drill carried by the first drill spindle 195 performs the operation above mentioned, drilling into the end of the blank while it is being operated upon by the tool 186. It will be seen that the drill and the blank on which it operates are both being rotated, of course in opposite directions. Inasmuch as the wire being operated upon is aluminum it is desired to get the speed of drilling up to a high point, approximately 4000 revolutions per minute. By rotating both the drill and the work this can be accomplished at what may be considered ordinary speeds.

The drill on the spindle 195 having performed its preliminary drilling operation the drill slide is withdrawn as the tool holder slide 182 is withdrawn and the turret is then indexed around one more position. In the second position the blank which has previously been mentioned is brought to the position indicated by the word "Drill" in Fig. 22, and the operations repeated. In this case the second blank is formed and drilled while the first blank receives its finish drilling operation from the drill carried by the spindle 196. This drill is a little bit longer and slightly larger than the first drill so that it performs a finishing operation.

Tuft filling.

It will be understood, of course, that the successive blanks are operated upon in this way. I will therefore trace only the first blank. The next position of the turret brings the blank into the position marked "Fill" in Fig. 22. In this position the head of the turret which supports the blank is freed from the belt as indicated in Fig. 9 and does not rotate. The tuft of bristles B is introduced longitudinally into the end of the blank while held in this position by means that will be described below. It is sufficient to say that it is pushed in positively and the pushing means drawn out so as to leave the doubled over part of the bristles extending to the bottom of the hole drilled in the blank and projecting from the mouth thereof.

Nicking.

On the shaft 109 is a nicking cam 200. This operates a lever 201 shown in Fig. 39. This lever is pivoted on the table 194 and is provided with two arms, one of which is integral with the lower part of the lever as indicated in Fig. 39, and the other arm 202 is pivoted on the same pivot. These arms are connected by a spring pin 203 which forces them yieldingly apart as far as possible. The arm 202 is provided on its end with a guide plate 204 and with a bumper 205 or other means for limiting its motion inwardly. In the present case this bumper is shown as spring-pressed and as engaging against the circumference of the temporarily stationary head which is located in position to be operated upon by these elements. This then limits the motion of this arm 202 inwardly and holds it in constant position. The arm 201 is provided with an adjustable rod 206 pivotally connected with the arm. At the end of this arm are pivoted two links 207, each one also pivoted to a lever 208. These levers are pivoted on projections 209 carried by the arm 202. Carried by these projections are guides 211 for reciprocating slides 212 which are pivoted to the levers 208. These slides carry nicking jaws 213. Each of these jaws is mounted on a pin holder 214 screw-threaded into the guide 212 and each one carries within it a nicking pin 215 headed in side and held in position in the nicking pin holder 214 by a screw 216. When these jaws come together the nicking pins are forced into the soft metal of the wire A to form two nicks $a'$. These are arranged to be located opposite each other and to extend in axially transverse to the plane of the tuft of bristles so that they will extend into the concave side of the bent over center thereof. The operation of these nicking jaws is shown in Figs. 42 and 43 especially and the results in Figs. 44 and 45, the former two figures showing two different positions of the jaws, the positions in Figs. 42 and 39 being the same.

Swedging mechanism.

It will be noted that after the turret indexes, when the nicking operation is completed, the head which has held the blank subjected to that operation will again come into rotation by its pulley engaging the belt. On the shaft 109 is a swedging cam 220 located in the present instance at the end of the shaft beyond the frame (Fig. 49). This operates by a lever 221 an adjustable rod 222 and oscillates a shaft 223. This shaft is provided with a slabbed off end 224 which projects into a frame 225 carried by the bristle hopper frame 219 and engages the ends of two swedge roll carrier levers 226 pivoted on a stud 227 carried by the same frame. Springs 228 force these ends of the levers against the end of the shaft 223 and it will be obvious that by the oscillation of this shaft the levers will be moved alternately to the positions shown in Figs. 46 and 47. While in the position shown in the former figure the nicked cup with its tuft of bristles therein comes up into position between the ends of the levers 226. In the present case one of these levers is shown as provided with two adjustable holders 229 each carrying a swedging roll 230. The other lever, that is, the one below, carries a single roll 231 in the same way. These rolls are mounted to rotate freely on bolts 232. When the shaft 223 turns to bring the parts into the position shown in Figs. 47 and 48 the rotating blank A engages the freely rotatable swedging rolls. They then operate upon it to reduce it from the form shown in Fig. 50 to that shown in Fig. 51. The lower one of these rolls 231 is shown as having a flange 233 thereon so as to give a finished product. This operation has the effect of turning the convex circumferential projection $a$ inwardly so as to form an inwardly projecting collar $a^2$ in intimate contact with the bristles of the tuft so that the same will be held permanently in the cup in addition to the holding action of the nicks $a'$. This also provides a circular passage and consequently a circular tuft. This is shown in Fig. 52. It will be noticed also that this metallic cup which forms the base of the bristle tuft is shown here as of uniform exterior diameter throughout its length and reduced from the full diameter of the aluminum wire blank.

*Cutting off.*

The next indexing of the turret brings this blank around to the position marked "Cut off and transfer" in Fig. 22. Referring now to Fig. 13 it will be seen that the tool holder slide 182 is connected by a slot and bolt construction at 237 with a lever 238 pivoted on the stationary frame 99 in which the turret operates, and this is provided with a non-rotary cutter 239 having a sharp cutting edge and adapted to move in toward the rotating blank and cut it off as indicated in Fig. 17. It will be noted that the cutter itself is shown as provided with a concave edge which acts to round off the end of the blank as it is cut off and removed. The tuft is then received by the transferring mechanism which will be described later, but I will first describe the means shown herein for forming the tufts and applying them to the cups in the position marked "Fill" in Fig. 22.

*Bristle mechanism.*

Referring now to Figs. 23 to 37 and also Figs. 1 and 2 it will be seen that the machine is provided with a bristle hopper on the frame 219. This comprises adjustable sides 241 supported on a base 242. These sides are adjusted toward and from each other and held in adjusted position by clamping screws 243 engaging guide rods 244 secured to the sides. It will be observed that the bristles are located in this hopper transversely and horizontally, the hopper being adjusted to the proper width to receive them without doubling or bending in any way. The rear of the hopper is closed by a concave plate 245 slidable along the hopper and normally urged forward by a hanging weight 246. Connecting the weight with this rear wall 245 is a feeder slide 247 operating in a guide groove in the bottom 242 and another in the cover 248. The cover is pivoted to the frame and held down by a spring 259. The bottom 242 is also provided with two other grooves 249 for receiving projections on the bottom of the plate 245 and guiding the same. This plate is shown arcuate in cross section to conform to the shape of the oscillating carrier 250 which is mounted to oscillate on the shaft 251 for the purpose of feeding the bristles.

The carrier 250 is operated by a cam 252 on the shaft 109 through a lever 253 which operates a vertically reciprocating slide 254 operating in a guide and connected by a substantially vertical link 255 with a pin 256 fixed on the oscillating carrier. The reciprocation of this slide 254 moves a link 257 up and down. A substantially vertical slot in this link receives a pin 258 mounted at the end of a retaining arm oscillatable on the shaft 251 and with this lost motion oscillates the same. This pin 258 also passes through a bristle retainer 260 adapted to hold the bristles in the hopper when the transferring part of the carrier has moved down beyond them. This has a slight swell 261 for pushing the front bristles down, during the downward motion. The carrier is bifurcated, and this retainer 260 is located in the slot between the two sides.

Through the edge of the oscillating carrier extends a notch 262 for receiving the bristles. This notch is provided with an adjuster 263 in the slot between the sides of the carrier, which by means of a screw 264 can be secured in adjusted positions along the notch to regulate its depth and consequently the size of the bunch of bristles to be received in it. The bottom of this notch is formed by a distance piece 265. Pivotally mounted on the carrier is an arm 266 having a projecting end 267 constituting a bristle lock. This end is angular in form and is located between the two sides of the carrier. The arm 266 is frictionally held on its stud so that it remains in any position in which it is placed. Mounted in stationary position on the frame 219 is a stop 268 and there is also another stop 269 which is stationary or adjustable for engaging a projection 270 on the arm 266 at alternate oscillations of the carrier. At the bottom of the bristle hopper is a spring-pressed plunger 271 projecting slightly into the hopper and providing a square base for the bristles nearest the carrier.

The movement of this carrier upwardly causes the notch 262 to pass along the bristles held by the hopper and on account of its angle they are forced inwardly so as to fill it. At the end of the upward motion the projection 270 comes into contact with the stop 268 and forces the bristle lock 267 into this notch so as to close it, excluding all the bristles beyond the edge of the lock and thus ensuring the exact filling of the notch with bristles. The parts then start downward and are maintained in this position during the downward stroke. At the end of the downward motion the projection 270 comes into contact with the stop 269 and raises the lock 267 so that the bristles are left free to be moved out of the notch and immediately thereafter the bristles come up against the flat end surface of the bristle guide 275, as shown in Fig. 30. The remainder of the motion of the carrier beyond this position results in forcing the bristles out at that point and leaving the bunch of bristles lying on a flat surface of the bristle carrier, as shown in Figs. 29 and 30.

On the shaft 109 is a needle cam 280 operating a lever 281 connected to a spring pin 282 for operating a bristle slide 283. This is mounted to slide in guide ways on this part of the frame 219. This slide 283 carries on it a plate 284 having a projection through which a rod 285 is free to slide and it also carries a fixed bristle needle 286 shown in Figs. 23 and 37. Mounted to slide in the same ways with this slide is the bristle guide 275 heretofore mentioned. This is connected pivotally with the end of the rod 285 and is provided with a spring-pressed pin 288 projecting out rearwardly from it and has a guide slot 289 through it for the needle. At the bottom of the bristle guide there is an inclined plate 290 which forms the edge of the passage 289 at the bottom.

It will be seen that the forward motion of the slide 283 carries with it positively the needle 286 which gathers the bristles in the notch at its end at the position shown in Figs. 29 and 30 and proceeds to push the bristles through the slot 289 as indicated in full lines in Fig. 31. At this time the bristle guide 275 is in stationary position being held by its friction with the passage in which it operates. Further motion of the slide and needle result in bringing the bristles into the position shown in dotted lines in Fig. 31. Then the slide engages the plunger 288 and finally the guide 275, after the needle has projected through the end of the guide and extends therefrom with the tuft of bristles surrounding its end and yet retained back in the narrow contracted throat of the passage 289. This causes this tuft of bristles to be forced into the metallic cup which has been formed and which is now in position marked "Fill" in Fig. 22, all of which is illustrated in Figs. 32 and 33. The completion of the stroke in that direction having been effected the slide starts back taking with it the needle and when it reaches nearly the end of the stroke the lug on the plate 284 engages the nut on the end of the rod 285 and pulls the bristle guide back with it throughout the rest of the stroke so as to leave it finally in the position shown in Fig. 29.

*Transfer mechanism.*

It has been described above how the tuft of bristles with its metallic cup is cut off the end of the wire and left in position to be removed from the tuft making mechanism. For the purpose of transferring the tuft "B" the following mechanism is provided, reference being had particularly to Figs. 53 to 62. On the shaft 109 is a transfer cam 300 operating a lever 301 which operates a rod 302 having spring-pressed connections at its ends. This oscillates a transfer frame 303 about a shaft 304, arranged longitudinally on the main frame. This frame 303 is provided near its outer end with a longitudinal shaft 298 having a fixed head 299 carrying a fixed thin jaw plate 305. This jaw plate has a curved edge 306. Mounted on an oscillating stud 307 carried by this head 299 is a corresponding movable jaw plate 308 having a curved edge. These two edges co-operate with each other to form jaws for engaging the tuft of bristles as indicated in Fig. 56. This frame is designed to oscillate about its shaft from the position shown in Fig. 58, in full lines to the position shown in dotted lines and in Fig. 53. In the former position the axis of the passage between the curved edges of the two jaws is in line with the axis of the bristle tuft as it is being cut off the wire and the parts are so timed that the elements come to this position just before that is cut off. Here a cam 295 on the shaft 298 engages a pin 296 to hold the shaft in proper position. The jaws first come to the position shown in full lines in Fig. 60 in which a tail 309 connected with the movable jaw 308 is still in contact with a pivoted latch 310. Just as soon as this tail 309 passes over the end of this latch 310, the position of which is limited by an adjusting screw 311, a spring 312 forces the jaw closed in the position shown in Fig. 56 and also shown in Fig. 60 in dotted lines. This grips the tuft of bristles as stated so that it can be moved away from the turret mechanism after having been cut off.

The frame swings down to the position shown in dotted lines in Fig. 58 actuated by the cam 300. At the end of this motion the cam 295 engages a pin 297 to hold the jaws vertical. During this motion downwardly the position of the jaws is changed. The shaft 298 on which is carried the so-called fixed jaw 305 is caused to swing to a certain position by a spring 316 connected to the jaw at one end and with a hub in which the shaft has a bearing at the other. This spring holds the shaft back in the position shown in Fig. 59 and also holds it against rotation beyond a certain point. A roller 317 is located on a lever 318 carried by the frame and connected by a pin with a double collar 319 fixed to the shaft 298. As the frame swings down this roller comes into contact with a transfer jaw lever cam 320 which is held by the head of a spring pin 321 substantially in fixed position. This contact results in sliding the shaft 298 longitudinally and moving the jaws 305 and 308 about this shaft as a center so as to bring these flat jaws into a position such that they move edgewise with the oscillation of this frame. It will be understood that these jaws are made wide and flat for the purpose of preventing any of the bristles in the tuft from being caught outside them and that they are turned to move in this way for the purpose of preventing their engaging any bristles previously set in the brush blank. The roller 317 moves down one side of the cam 320 and then urged by the spring 316 snaps by it and under it on the downward motion. The parts at the end of this downward motion are brought substantially into the position shown in Fig. 53 when the spring 316 holds the jaws in vertical position and the lever 318 is free of any control by the cam 320 because it has passed beyond it.

Mounted on the shaft 109 is a squeeze cam 325 which operates a lever 326, a link 327 and an arm 328 fixed on a hollow shaft 329 which is oscillatably mounted on a transverse shaft 324 which is supported by the frame 219 and a bracket 323. This hollow shaft is provided with a cam 330 which engages a roll 331 on a plunger 332. This plunger is provided with a slanting end surface 333 which the end of the shaft 298 engages as the frame 303 descends. At the same time the squeeze cam operates to force the plunger 332 forward and thus force the shaft 298 forward. It will be noted that the jaws 305 and 308 grasp the bristles of the tuft and not the metallic cup. This is indicated especially in Figs. 55 and 61. The edge of the metallic cup is spaced slightly from the jaws and when the jaws move forward, in the position shown in Fig. 53 and in the manner just described, the cup is intended to enter a hole in a brush blank C and the jaws then engaging the edge of the cup positively force the same in so as to insert it and cause it to be held frictionally therein.

The cam 330, passing around out of its active position, a spring 334 mounted on a fixed pin and engaging in a notch 335 in the end of the plunger forces the plunger back toward the shaft 324 while the spring 316 acts also to force the shaft 298 back. This withdraws the jaws from the tuft of bristles set in the brush back and leaves the frame in a position to rise about its shaft at the next oscillation produced by its cam. On the upward motion roller 317 passes along the backside of the cam 320 and forces the same back against the action of the spring 321 which also helps hold the shaft 298 back to its extreme position at the right end.

Fig. 61 shows the jaws pushing the cup into the brush blank and Fig. 62 shows the position of the parts when completed. This completes the operation of setting a single tuft of bristles in a brush blank and I will now proceed to describe mechanism for manipulating the blank itself.

*Brush turret driving and indexing mechanism.*

On the shaft or rod 324 is oscillatably journalled a frame 341 which is provided with forked bearings for that purpose as shown in Fig. 53. The slight oscillation which this frame has up and down will be referred to later. Referring now to Fig. 64, it will be seen that the shaft 109 by means of bevel gears drives a transverse shaft 350 which is a drive shaft for this part of the mechanism. On this shaft is fast a gear 351 which meshes with a loose gear 352 rotatable on the transverse index clutch shaft 353. This shaft consists of two parts connected by a universal joint 356. It is on this shaft that is located a sliding keyed pinion 354 meshing with the turret index gear 416. A spring-pressed clutch member 355 is arranged to transmit power from the gear 352 to this shaft 353 and thus rotate the turret. For the purpose of operating this clutch the shaft 358 is oscillated intermittently by means to be described below. Fixed on this shaft is an arm 359 which is provided with a roll 360 entering the groove 361 in the clutch member 355. Normally the spring would hold the clutch member closed, but when this roll moves into the end of the groove (shown offset in Fig. 64) it draws the clutch member away and stops the rotation of the shaft 353. The shaft remains stopped, of course, until the shaft 358 is moved to withdraw the roller from position. A spring 362 (Fig. 3) keeps the roller in engagement with the clutch member so that it will automatically move into this groove when the same has nearly completed a revolution.

Loosely mounted on the shaft 358 is a locking arm 363 which when the arm 359 is drawn back, is moved with it on account of a projection 364 on the latter extending behind the arm 363. A spring 365 (Fig. 3) acts constantly to pull this arm toward the clutch so that when it is allowed to move in that direction by the arm 359 a wedge-shaped projection 366 on the back of the locking arm will engage in a longitudinal groove 367 in the clutch member 355. The object of this is to provide for positively stopping the rotation of the clutch member just at the end of a complete revolution so that the index clutch shaft 353 can rotate just once and then be forced to stop exactly on the right point.

On the shaft 350 there is a cam 370 which operates a cam roller 371 on a lever 369 freely swinging on the shaft 358. By means of an adjustable link 372 this lever is adjustably connected with a pawl lever 373 freely pivoted on a transverse shaft 374. (Figs. 63, 64 and 68). This lever carries a spring-pressed pawl 375 adapted to engage ratchet teeth on a wheel 376 fixed on the shaft 374. For each oscillation of this lever the wheel 376 will be advanced one step, which according to the adjustment will be the length of one tooth or a greater number as may be desired. In the form herein shown there are forty-seven of these teeth on the wheel and the wheel operates the width of one tooth at each operation.

Rotating with the shaft 374 is a clutch operating dog 377 which engages an arm 378 fixed to the shaft 358 and operates that to stop the rotation of the turret at the end of each complete rotation of the shaft 374.

*Longitudinal turret motion.*

Secured on this shaft 374 is a lengthwise cam 380, the rear of which is shown in Fig. 73. This cam is provided with an intermittent spiral groove 381 for receiving and controlling a roll 382 mounted on the end of a lever 383. It will be obvious that starting from the position shown in Fig. 73 the rotation of this cam will cause this roll to be moved step by step farther from the center of the shaft 374 and the lever to be moved outwardly, intermittently. There are sixteen steps or motions to this cam and it takes three oscillations of the lever 373 and the advance of the wheel 376 three steps to move the roller 382 from one level to the next one in the form shown. The operation of the lever 383 in this manner turns a shaft 384 by means of adjustable studs 385 on the lever and a plate 389 on the shaft. A lever 386 on the shaft 384 is thus moved. On this is mounted a pin yoke 387 having pins engaging between two flanges of a flanged wheel 388 located on opposite sides of the pinion 354 on the shaft 353. These flanges engage the opposite sides of the brush turret index gear 416 and cause it, together with the whole turret, involving the parts 458 and 459 and the jaws 461 and 462 carried thereby, to move along a shaft 411 on which they are rotatably mounted, this shaft being stationary. The sleeve 410 moves with them. The cam 470 has a slot 469 through which the end of the arm 471 moves at this time.

At the end of the spiral groove the roll 382 enters a notch in the end of a pawl 390. This pawl is provided with a long slot 391 through which it is pivoted on a screw 392 carried by the cam and is normally held in the position shown in Fig. 73 by a spring 393. Just behind the rear edge of this pawl is a spring-pressed latch stop 394. As the cam rotates in the direction indicated the roller 382 will come out until, in the present instance at the 47th position, it enters this notch in the pawl 390 and presses the whole pawl backwardly until the end of the pawl snaps over the latch 394 and allows the parts to move to the position shown in Fig. 75 so as to drop the roll 382 back into its first position. The pressure being removed from the pawl it then snaps back into the position shown in Fig. 73. This mechanism is for the purpose of feeding the brush turret longitudinally by a step-by-step motion into sixteen different positions. It will be understood that in each one of these positions certain operations are performed on the brush blank as will appear below.

*Vertical turret motion.*

This part of the mechanism if used alone would merely provide one line of holes or tufts in the brush, but as indicated in Fig. 76 the machine as designed and shown in these drawings is adapted to place three lines of bristle tufts and two extra ones at the end making forty-seven in all. In order to accomplish this the shaft 374 is provided with a cross-wise cam 395. This is fixed to the shaft and is provided with forty-seven steps thereon. These are divided into fifteen series of three steps each, a low, an intermediate, and a high step in each case, and two additional steps constituting the last and next to the last in the series, but, of course the arrangement would be different if a different number of tufts were to be set in the brush. These steps are indicated by the numerals 1, 2, 3, 4, . . . 45, 46 and 47 in Fig. 71. It will be understood that while the roller 382 is moving along one concentric surface during the three advancing steps of the shaft, the roller 396 which rests on the cam 395 will be lowered from a high step to an intermediate one, and then to the low step of that series.

The effect of this roller is as follows: It is mounted on a member 397 which is forked at the bottom to guide it about the shaft 374 and at its upper end a rod 398 connected with it vertically reciprocates a rest 399 on the top of said rod on which the frame 341 rests, and consequently it raises and lowers that frame about its pivot shaft 324 with all the parts supported upon it. Starting from the position marked "1" in Fig. 76, when the roller 382 is in the position shown in full line in Fig. 73, the roller 396 is on the first of the high surfaces 1 of the cam 395. The brush blanks held by the turret will be located in a position which may be represented by the numeral 1 in Fig. 76 and operated on as will appear. As the wheel 376 moves through the space of one tooth the roller 396 is lowered down on the intermediate surface 2, and the brush blank brought to the position marked "2." Then it is let down into the first low surface 3 and the brush blank brought to the position marked "3." On the next step the roller 382 is lifted to its next surface which moves the brush turret and the blank along to the next column of figures in Fig. 76, and the roller 396 rises on the next high surface 4 so as to bring the brush blank to the position "4" in Fig. 76.

Drilling brush blank.

The first operation performed during this motion of the brush blank is the drilling operation. While this is taking place the blank is in the position marked "Drill" in Fig. 78. The lever 369 which is oscillatably mounted on the shaft 358 is connected with a link 400 and through a lever 401 on a bracket 402 reciprocates a drill head 403 to cause the drill to advance and drill a hole at each one of the different positions marked in Fig. 76. This drill head is operated from the shaft 172 by means of a pulley 404 and belt.

It is also during this motion that the tufts are set in a blank in the opposite position, namely, the position marked "Fill" in Fig. 78. This has been described as operated from the shaft 109 by cams 325 and 330.

Hopper mechanism.

The gear 351 is in mesh with a gear 419 which drives a gear 420 loose on the cam shaft 421 for controlling the handle mechanism (see Fig. 83). On this shaft there is a spring-pressed sliding member 422 adapted to be operated by a lever 423 pivoted on a stud 424 and having a pin 425 operated by a cam 426 on the shaft 353. This pin 425 is made adjustable in a slot and secured in adjusted position by a set screw 427. The other arm of the lever 423 is provided with a stud or roll 428 entering a groove in the sliding clutch member 422 for the purpose of moving it. This groove, as shown in Fig. 86, is offset at the end and the clutch member works in the same way as the clutch member 355, that is, the clutch is automatically opened at the end of a revolution. In order to insure that this shaft 421 shall rotate exactly one revolution the clutch member 422 is provided with a groove 429 and on the lever 423 is a spring-pressed pawl 430 for entering said groove and stopping the clutch member and therefore the shaft exactly at the end of the revolution.

On this shaft 421 is a cam 431 (Fig. 82) which controls a roll 432 on a link 433. This link is bifurcated at its end to form a support and guide on the shaft 421 and at the other end it is connected with a lever 434 which is pivoted at 435 to the end of the frame 341. The other end of this lever above is pivoted to the handle hopper 436. Obviously the motion of the roller 432 out and in with relation to the shaft 421 reciprocates the link 433 and oscillates the lever 434 so as to move the hopper back and forth to bring it into registration with the brush handle turret for delivery thereto.

The hopper has an inclined back plate against which the blanks rest. It is controlled by two angular end plates 437, each held in position by adjustable brackets 438 supported by the hopper itself. The brush blanks can be piled up in the hopper and fed down by gravity. If desired, a weight can be applied to them to insure their proper feeding, but it is not shown herein as it is not a necessary part of the machine.

Also mounted on this shaft 421 is a feed and ejector cam 440 operating a roll 441 on a lever 442 pivoted on the shaft 358. This lever is provided with a lost motion connection with an adjustable rod 443 which in turn is pivoted to an adjustable member 444 carried by a lever 445 pivoted on the back of the hopper 436. (Figs. 87 to 93). This lever is connected at its lower end by a link 446 with a horizontal slide or plunger 447 having a plate 448 for supporting, parallel with it and spaced from it, a rigid pusher 449. The movement of the roll 441 out and in with relation to the shaft 421 reciprocates the link 443, with a lost motion at the end of the stroke, swings the lever 445 and reciprocates the plunger and pusher so as to move the plunger along on a guide 439 at the bottom of the hopper 436.

Mounted on the end of the plunger or slide 447 is a rod 450 having on the end thereof adjustable nuts 451 constituting a stop. On the hopper is pivoted a feed finger pawl 452 having a projecting end 453 adapted to project in under the bottom of the hopper to support the end of the next to the lowest tooth brush blank or handle C. The lowest one is supported at this time by a plate 457 so as to project over the brush turret. A spring 454 normally holds this pawl up in the position shown in Fig. 89, the rod 450 passing through a notch 455 therein. When the parts are in the position shown in Figs. 88 and 92 the stop 451 has forced this pawl over to the left to move the lowest blank to the left and hold the rest of the blanks in the hopper as indicated. As soon as the plunger moves to the right far enough to allow the stop 451 to release the pawl 452 the latter moves over to the position shown in Fig. 89, being stopped by a flat surface 456 at the end of the pawl. This allows the pile of brush blanks to drop down as indicated in this figure when the plunger moves over. It will be understood that at the moment of feeding the whole hopper is moved over by the action of the cam 431 to register with the brush turret which will now be described.

Brush clamping jaws.

The frame 341 is provided with bearings which support a hollow nonrotatable but slidable sleeve 410 and a non-rotatable brush turret index shaft 411 which enters the end of the sleeve and has a bearing in it. The shaft 411 has rotatable on it a turret index wheel 416 in the form of a gear driven by a sliding pinion 354 on the shaft 353 and having a hub 458 secured to it. Spaced from this is a plate 459, and these parts together with certain others to be described, constitute the brush holding turret. Journalled in the hub 458 and the plate 459 are a plurality of parallel studs or shafts 460, six being shown in the present instance. Extending out substantially radially from each of these and held against the plate 459 are the same number of stationary jaws 461. These, of course, rotate with the turret head and form a part thereof. Pivotally mounted on the shafts 460 are corresponding movable jaws 462. Springs 463 normally force the movable jaws inwardly against a sliding wedge 464 which is located between each pair of jaws. These jaws are provided with inwardly extending projections 465 on the edge adapted to engage the brush blanks C and hold them in position.

For the purpose of operating the movable jaws to permit them to receive and discharge the brush blanks the following mechanism is provided. The shaft 421 is provided with a wedge cam 470 operating an arm 471 on a vertical shaft 472. This cam has a radial slot 469 to permit the end of the arm 471 to move through when the turret moves in one direction as has appeared. A spring 473 is provided for holding this arm against the cam surface and the shaft has another arm 474 at its upper end. This by means of a pin-and-slot connection operates a lever 475 pivoted on the frame 341 which reciprocates a rod 476 extending axially through the sleeve 410. This rod is provided with a pin 477 extending through slots in the sleeve 410 so as to engage and reciprocate a slide 478. This slide is provided with a pair of projections 479, one of which is shown in Figs. 79, 88 and 89 as operating the wedge 464. This wedge is provided with a plurality of slanting slots 480 engaging operating pins 481 carried by the several stationary jaws 461. As the wedge is pushed inwardly toward the wheel 416 by the projection 479 the wedge is raised between the jaws so as to clamp the brush back under the projections 465. At the same time a wedge-shaped end 482 on the wedge 464 moves outwardly beyond the end of the movable jaw 462 as shown in Fig. 80 and allows the spring to close that jaw. The wedge is forced out substantially into contact with the wheel 416 at its end.

As the operation of depositing a brush blank in the turret has been described in a general way, it is sufficient to say that by the reciprocation to the right of the plunger 447 the pusher 449 forces the lowest blank C in the hopper out of the hopper under the feed finger pawl 452, and the pusher moves the blank up against an adjustable stop screw 484 on the wheel 416. The parts then move back into the position shown in Fig. 89. The pawl 452 allows another blank to drop down on the plate 457 and at the end of the reverse motion the end of the pawl 452 forces the lowest blank C into the position shown in Fig. 88. Before this has been accomplished the projection 479 has been drawn back so that the wedge 482 forces the movable jaw to the right and opens it and the wedge 464 is lowered between the jaws. This leaves the jaws in proper position to receive the blank. Thereafter the wedge is moved in the opposite direction to the position shown in full lines in Figs. 80 and 81. The movable jaw closes and the wedge rises so that the blank is clamped in the turret.

Ejector mechanism.

I will now describe the closely related mechanism for ejecting the brush blank from the turret. The position in which the blank is fed is indicated by the word "Feed" in Fig. 78 and the ejecting position by the word "Eject" in that figure. Referring now again to Fig. 82 it will be seen that the lever 442 operates a substantially vertical rod 490 adjustably connected with an arm 491 on a shaft 492 carried by a stationary ejector frame 493 on the frame 341. This shaft has another arm 494 which is connected by link 495 with an arm 496 on a shaft 497 which has a slotted arm 498 engaging a pin 499 on an ejecting hook 500. This hook is mounted on a slide 501 movable in ways on the frame 493. This ejector arm 500 oscillates from the position shown in Fig. 94 to that shown in Fig. 95 where the end of the hook passes down behind the end of the brush blank ready to draw it out of the turret on the backward movement of the slide 501. It will be noticed that just previously the wedge 464 has just been operated to release the brush blank, the two positions of the wedge being clearly indicated in Figs. 94 and 95.

The slide 501 itself is operated by these arms and links 494, 495, and 496. The motion of the arm 494 in the direction of the arrow in Fig. 94 causes the slide to move back away from the stop 502 to the left taking with it, of course, the hook and brush handle and ejecting the same into a hopper or other receiving means as desired. A stop 503 is provided for limiting the downward motion of the ejector hook.

*Operation.*

The operation of the machine is as follows:—A plurality of wires A, as stated, are located on the wire-carrying reel which is capable of rotating in its supports with the cup-forming turret. This turret is rotated intermittently, a step at a time, and one wire having been pushed forward through the first chuck or head is stopped in a definite position and then clamped by the clutch. The turret then rotates one sixth of a revolution and stops. The first drill is brought up to it so as to drill out a hole axially into the end of the wire. The means whereby the exterior of the cup is made convex at the extreme end thereof operates on the wire while it is being preliminarily drilled. Then the head rotates one step and stops when the second drill is brought up into position and further drills out the opening. This second drill is a little larger and longer than the first one so that it finishes the opening and brings it to depth. It will be understood that the two drills always act simultaneously one on a new wire and the other on a wire which has been through the first step of the operation. The two drilling operations having been completed the head rotates a third step and the first mentioned blank is then brought up into position to receive a tuft of bristles which is supplied to it in a way which will be described below. It will be understood that the head is stopped here while the tuft is inserted in the cup and that the nicking or clinching jaws are operated to force the metal of the cup inwardly at two opposite sides to clinch the tuft in position. The belt which rotates the several heads with which the turret is provided is so arranged that it engages the pulleys of the several heads in all positions thereof except in this position and here it is free from the pulley and consequently the head does not rotate while the tuft is being applied to it nor during the nicking or clinching operation. After that is finished the turret rotates another step bringing this pulley into contact with the belt again and the turret comes to a stop in the next position where the convex edge of the cup is forced inward to permanently clinch the bristles and complete the tuft. Then the cutter acts to cut off the cup with its tuft of bristles. At this stage the transferring means takes the cup and delivers it to the mechanism for applying the bristle-filled cups to the brush blank. The turret, of course, stops while the cup is cut off and discharged from this part of the machine, but the head rotates on its own axis.

In order to form the tufts the following operation takes place. The bristles are placed in the hopper and constantly pressed toward the discharge end thereof. The oscillating bristle gathering device oscillates past the exposed end of the hopper and gathers up as many bristles as its notch will hold according to its adjustment. In gathering these it takes them at their centers preferably and forcibly pulls them out of the hopper, their ends yielding on account of the natural resiliency of the bristles. The tuft of bristles thus gathered is brought down to the slide below and laid on the guide up against the stop. While in this position the needle reciprocates through the passage in the guide taking with it the bunch of bristles and engaging them at their centers. This forces the bristles through the straight passage, doubling them up about its end in the process. The needle forces the tuft of bristles thus formed straight out into the metallic cup, which is at that time in alignment with the needle, and leaves them in this cup. It is as this needle is withdrawn that the clinching or nicking operation takes place to force opposite metallic projections into the tuft and permanently secure the bristles in the cup.

The last operation before the cup is cut off from the wire is to force inwardly the convex enlargement at the end of the cup to finish the cup and tuft and still leave the cup of uniform diameter outside. In other words, the projection which formerly was outside is now located on the inside and the outside left in a true finished form. This projection on the inside grips the bristles and permanently holds them in position, the nicking operation being mainly for temporarily holding the tuft in the cup.

When the completed tuft in its cup is just ready to be finally separated from the wire held by the head, the transferring device swings up into position to engage the bristles and prevent the tuft falling away and at the same time hold it on the transferring device. The details of the operation of this transferrer having been described in connection with the description of its mechanism this operation will not be repeated here, but it is sufficient to say that the transferrer having grasped the tuft beyond its metallic cup swings over through a considerable arc into a substantially horizontal position from which the tuft is applied to the brush handle or blank under pressure and left secured therein by friction.

The operation on the brush blank is as follows:—These blanks, having been previously formed to the proper length and other outside dimensions, are placed in the brush blank hopper. During each complete operation of this machine this hopper is reciprocated and the lower blank discharged therefrom on one of the faces of the brush blank turret. The blank is left on the turret in the proper position and one of the spring gripping jaws thereon engages the blank and holds it in its proper relative position to the turret. The wedge also moves to receive it in place. The turret is then indexed around one step which brings another face into position to receive another blank. The motions of the turret to bring the brush blank into position for drilling have been described above and it is sufficient to say here that these motions are both circumferential and longitudinal and that in the present design there are three circumferential motions thus providing for the drilling of three rows of holes and that the longitudinal motion shifts the blank along step by step. The last row of two holes is provided for by the shape of the cam as stated. This particular design can be varied of course simply by changing the cams which control the two motions of the turret. The brush blank having passed through all these motions and the desired number of holes having been drilled, the turret indexes around again through two idle positions while two other blanks are being drilled and then comes up to the fifth position in which it is directly opposite the drilling position and at that time the tufts are supplied from the transferring device in proper order and inserted in the holes in the blank in the same order in which the holes are being drilled in a fresh blank oppositely located. The operation of the turret to bring it to the drilling positions also serves to bring this blank to the proper positions for tufting. The tufts having been applied and forced into the holes by the mechanism which has been described, the turret is again indexed around to the sixth position where the ejector engages the now completed brush and forces it longitudinally out of the spring clamp, which has held it, into a hopper, conveyor or any other receiving means (not shown).

It will be seen therefore that this machine is entirely automatic taking three raw products, bristles, wires and previously formed brush blanks at different points, forming the bristles into tufts, forming the wire into holding cups for the tufts, drilling the blanks and forcing the tufts into the holes thus formed so as to produce the complete brush which needs only to have the bristles trimmed down to the proper length after it leaves the machine. All the parts are conveyed from one position to another in the machine automatically and there is no need for any expert oversight of the operations. Practically all that the operator has to do is to see that the machine is running, and to see that it is properly supplied with the three kinds of raw products which it uses.

The strictly metal working mechanism by itself and the tuft forming and setting mechanism by itself are not claimed herein independently of other features of the machine as they form the subject matter of two divisional applications filed on the date of renewal of this case. The method of manufacture herein disclosed is also not claimed as it constitutes the subject matter of a divisional application.

Although I have illustrated and described only a single embodiment of the invention and shown it as applied to a definite character of brush I am aware of the fact that many modifications can be made in the details of construction and combinations of parts of the mechanism and that it can be applied to the manufacture of other types of brushes without departing from the scope of the invention as expressed in the claims.

Therefore I do not wish to be limited in these respects, but what I do claim is:—

1. In a brush making machine, the combination with a plurality of heads having wire gripping means and movable successively to different positions, of means whereby when each head comes to a certain position its grip on the wire is released and the wire held by that head is cut off and fed forward so as to project through the head, means for boring out the projecting end of the wire as it moves around, and means for inserting a tuft of bristles axially into the end thereof.

2. In a brush making machine, the combination of a plurality of heads for holding a wire, means for drilling a hole centrally into the end of the wire, means for inserting a tuft of bristles into the hole, means for then shaping the wire to force it inwardly for the purpose of holding the tuft of bristles therein, and means whereby the end of the wire is shaped to force it inwardly around the bristles and permanently hold them in position.

3. In a brush making machine, the combination of a head for holding a wire centrally therein, means for feeding a wire through the head, means for stopping the wire and limiting its position when the feeding operation is complete so that the wire will project, means for shaping the end of the wire, means for simultaneously drilling a hole centrally into the end of the wire, means for inserting a tuft of bristles into the hole, means for then shaping the wire to force it inwardly for the purpose of holding the tuft of bristles therein, means whereby the end of the wire is shaped to force it inwardly around the bristles to permanently hold them in position, and means for cutting off the end of the wire with its enclosed bristles and shaping the end of the cut off cup.

4. In a brush making machine, the combination of a plurality of heads, each for holding a wire, means for shaping the end of the wire, means for simultaneously drilling a hole centrally into the end of the wire, means for completing the hole, means for inserting a tuft of bristles into the hole, means for then shaping the wire to force it inwardly for the purpose of holding the tuft of bristles therein, means whereby the shaped end of the wire is shaped to force it inwardly around the bristles and permanently hold them in position, means for cutting off the end of the wire with its enclosed bristles and shaping the end of the cut off cup, and means for rotating the heads during the drilling, cutting off, and shaping operations.

5. In a brush making machine, the combination of a head adapted to hold a cup projecting therefrom, a lever, means for yieldingly forcing said lever toward the cup, a bumper yieldingly connected with said lever for engaging said head to limit the motion of the lever toward it, and means operated by said lever for forming opposite nicks in the cup to hold a tuft of bristles therein.

6. In a brush machine, the combination of means for holding a cup, a lever movable toward and from the same, but yieldingly supported, a bumper carried by said lever, means located in the path of said bumper for limiting the position of said lever, and a pair of opposite nicking pins operated by the lever.

7. In a brush making machine, the combination of a positively operated lever, an arm yieldingly connected with said lever to be operated thereby, means for limiting the motion of the said arm forward with the lever, a guide plate carried by said arm, a system of levers carried by the arm, means carried by the first named lever for operating said levers, and means operated by said levers for nicking the opposite sides of a bristle holding cup for securing a tuft of bristles therein.

8. In a brush making machine, the combination of a pair of plungers located axially in alignment, means for forcing said plungers toward each other, each of said plungers having an adjustable pin holder therein, and a pin projecting through the end thereof toward the other plunger, and guides located at the ends of said pin holders for guiding the same with respect to the work.

9. In a brush making machine, the combination of means for holding a wire, with means for shaping the wire to form an external rib near the end thereof, means for thereafter drilling a hole in the end of the wire centrally, means for inserting a tuft of bristles therein, and means for thereafter shaping the wire to bring it to a uniform diameter outside and force the external metal near the end inside to form a ridge therein for engaging and permanently holding the bristles.

10. In a brush making machine, the combination of means for inserting a tuft of bristles into a central opening in the end of a wire, means for forming inward projections in the wire to temporarily hold the tuft in position, and means for thereafter shaping the outside of the wire to force a ridge of metal near the mouth of said opening inwardly into contact with the bristles to hold them permanently in position.

11. In a brush making machine, the combination of means for holding a metallic cup having a tuft of bristles axially located therein, a shaft having a cam surface, a pair of levers having their ends engaging said cam surface and adapted to be forced together at their opposite ends thereby, swedging rolls carried by said levers for engaging said cup, and means for rotating the cup on its axis while the rolls engage it.

12. In a brush making machine, the combination of an intermittently rotary turret having a plurality of rotating heads thereon, means for forming a wire held by one of the heads, means for simultaneously cutting off a wire by another head, and means for simultaneously applying a tuft of bristles to the wire held by another head intermediate between the first two.

13. In a brush making machine, the combination of means for holding a metallic article having on the end a cup with a tuft of bristles set therein, means for detaching the cup, a movable frame, a pair of jaws held by said frame and adapted to engage the tuft of bristles just before the cup is detached to move the same from said holding means as said frame moves.

14. In a brush making machine, the combination of means for holding a metallic article having on the end a cup with a tuft of bristles set therein, means for detaching the cup, a movable frame, a pair of jaws held by said frame and adapted to engage the tuft of bristles just before the cup is detached to move the same from said holding means as said frame moves, and means whereby said jaws are moved bodily during the motion of the frame without losing their grip on the bristles.

15. A transferring mechanism for a brush making machine comprising a movable frame having two jaws thereon, each jaw consisting of a wide plate having its end curved up into a substantially semi-circular form for gripping a tuft of bristles between the said curved ends, whereby when said jaws are presented to a tuft of bristles the spreading bristles will be engaged by the wide surfaces of the jaws.

16. A transferring mechanism for a brush making machine comprising a movable frame having two jaws thereon, each jaw consisting of a wide plate having its end curved up into a substantially semi-circular form for gripping a tuft of bristles between the said bent ends, whereby when said jaws are presented to a tuft of bristles the spreading bristles will be engaged by the wide surfaces of the jaws, and yielding means for swinging one jaw against the other about an axis at a distance from its curved end to grip a tuft between said curved ends.

17. In a transferring mechanism for a brush making machine the combination of a swinging frame, a pair of wide jaws carried by said frame, each jaw having a curved end, said curved ends being adapted to come together and close about a tuft of bristles, one of said jaws being mounted to swing on an axis carried by said frame at a distance from the curved end of that jaw.

18. In a transferring mechanism for a brush making machine, the combination of a swinging frame, a pair of oppositely extending jaws carried by said frame, said jaws having operative ends adapted to come together and close about a tuft of bristles, one of said jaws being mounted to swing on an axis carried by said frame at a distance from the operative end of that jaw, a projection fixed with respect to said swinging jaw, and a stationary cam positioned to engage said projection as the frame moves for operating the jaw.

19. In a transferring mechanism for a brush making machine, the combination of a swinging frame, a pair of jaws carried by said frame, one of said jaws being mounted to swing on an axis carried by said frame, a pivoted member carried by the frame on which the other jaw is mounted to swing about its end as a center, a projection thereon, and stops located in position for engaging said projection and operating said jaw near the ends of the stroke of the frame.

20. In a transferring mechanism for a brush making machine, the combination of a swinging frame, a pair of wide jaws carried by said frame, each jaw having a curved end, said curved ends being adapted to come together and close about a tuft of bristles, one of said jaws being mounted to swing on an axis carried by said frame at a distance from the curved end of that jaw, a projection fixed with respect to said swinging jaw, a stationary cam positioned to engage said projection as the frame moves for operating the jaw, an auxiliary frame on the first named frame mounted to swing on the axis of the curved end of the other jaw, means whereby said auxiliary frame is caused to turn at the ends of the stroke of the main transferrer frame, the second jaw and the parts carrying the first named jaw being mounted on said auxiliary frame, whereby the second jaw will swing about the axis of the tuft of bristles without opening.

21. A transferring mechanism for a brush making machine comprising a swinging transferrer frame, a shaft oscillatably mounted on said frame, a jaw fixed on said shaft and having a curved end, a second jaw pivotally supported by said shaft and having its free end curved and arranged to swing on its pivot so as to bring its curved end into registration with the curved end of the fixed jaw at the axis of the shaft, and means for turning said shaft on the frame.

22. A transferring mechanism for a brush making machine comprising a swinging transferrer frame, a shaft oscillatably mounted on said frame, a jaw fixed on said shaft and having an operative end, a second jaw pivotally supported by said shaft and arranged to swing on its shaft so as to bring its free end into registration with the operative end of the fixed jaw at the axis of the shaft, said shaft having an arm projecting therefrom, and stop pins located in position to engage said arm at the two ends of the stroke of the transferrer frame for turning said jaws as a whole about the axis of the shaft as a center.

23. A transferring mechanism for a brush making machine comprising a swinging transferrer frame, a shaft oscillatably mounted on said frame, a jaw fixed on said shaft, a second jaw pivotally supported by said shaft and arranged to swing on its shaft so as to bring its free end into registration with the fixed jaw at the axis of the shaft at the end of the stroke of the transferrer frame, and means for causing said jaws to move edgewise at the delivery end of the stroke.

24. A transferring mechanism for a brush making machine comprising a swinging transferrer frame, a shaft oscillatably mounted on said frame, a jaw fixed on said shaft, a second jaw pivotally supported by said shaft and arranged to swing so as to bring its end into registration with the fixed jaw, and means for moving said shaft longitudinally during the motion of the frame.

25. A transferring mechanism for a brush machine comprising an oscillatable frame, a shaft carried by said frame, a jaw carried by said shaft, a second shaft having a jaw thereon adapted to cooperate with the first named jaw, means whereby as the frame oscillates toward delivering position said shaft is moved forward axially, and means for positively forcing the shaft forward under pressure when the frame is in delivering position for the purpose of forcibly projecting a tuft of bristles into a brush back.

26. A transferring mechanism for a brush machine comprising an oscillatable frame, a shaft carried by said frame parallel with the axis on which the frame oscillates, a jaw carried by said shaft, a second shaft also fixed to move with the first named shaft and parallel with it having a jaw thereon adapted to cooperate with the first named jaw, means for moving the second jaw by turning its shaft when the frame approaches receiving position, means for yieldingly closing said jaw when the frame is in receiving position, means whereby as the frame oscillates toward delivering position said shaft is moved forward axially, and means for positively forcing the shaft forward under pressure when the frame is in delivering position for the purpose of forcibly projecting a tuft of bristles into a brush back.

27. A transferring mechanism for a brush machine comprising a movable frame, a jaw movably carried by said frame, a second jaw thereon adapted to cooperate with the first named jaw, means for moving the second jaw when the frame approaches receiving position, means for yieldingly closing said jaw when the frame is in receiving position, means whereby as the frame oscillates toward delivering position said jaws are moved forward axially, means for positively forcing the jaws back when the frame moves away from delivering position.

28. A transferring mechanism for a brush machine comprising a movable frame, a shaft having its axis in a plane parallel with the direction of movement of the frame, said shaft having jaws thereon for gripping a tuft of bristles, a spring for normally forcing said shaft in one direction, a cam in position to positively move said shaft in opposition to the spring while the frame is moving from receiving to delivering position, and a cam for positively forcing said shaft further forward when the frame is in its delivering position.

29. A transferring mechanism for a brush machine comprising a movable frame, a shaft having its axis in a plane parallel with the plane of movement of the frame, said shaft having jaws thereon for gripping a tuft of bristles, a spring for normally forcing said shaft in one direction, a cam in position to positively move said shaft in opposition to the spring while the frame is moving from receiving to delivering position, and a cam for positively forcing said shaft further forward when the frame is in its delivering position, said cam being yieldingly mounted to permit the frame to move back without putting the shaft under the control of the cam on the reverse motion.

30. In a brush making machine, the combination of means for holding a metallic article having on the end a cup with a tuft of bristles set therein, means for detaching the cup, a movable frame, a pair of jaws held by said frame and adapted to engage the tuft of bristles just before the cup is detached to move the same from said supporting means as said frame moves, said frame being mounted to oscillate about an axis, a cam for operating said frame, and a spring-pressed link between the cam and frame for yieldingly transmitting power from the cam to the frame to swing it on its axis.

31. In a tuft setting mechanism, the combination of means for supporting a brush blank having a socket therein, a frame having a pair of jaws mounted thereon for gripping a tuft of bristles adjacent to the end of a metallic cup forming the butt thereof, said frame being movable sideways for moving the cup into axial alignment with said socket, means whereby as said frame is moved toward a position for setting the bristles said jaws will be moved longitudinally toward the brush blank, and means for thereafter positively forcing said jaws forward against the end of said cup to force the tuft of bristles into the brush blank.

32. In a tuft setting mechanism, the combination of means for supporting a brush blank having a socket therein, a frame having a pair of jaws thereon for carrying a tuft of bristles into axial alignment with said socket, a shaft supported on said frame on which said jaws are supported, said shaft being axially in alignment with the jaws and with the tuft of bristles carried thereby, means whereby as said frame is moved toward a position for setting the bristles said shaft will be moved forward toward the brush blank, a plunger mounted in stationary position in alignment with the shaft in its final place, means for positively forcing said plunger forward against the end of said shaft to force the tuft of bristles into the brush, said plunger having an inclined end thereon for receiving the end of the shaft and guiding it into position in front of the plunger, and yielding means for forcing the plunger back against its operating means.

33. In a tuft setting mechanism the combination of means for supporting a brush blank having a socket therein, a frame having a pair of jaws thereon for conveying a tuft of bristles into axial alignment with said socket, a shaft supported on said frame on which said jaws are supported, means for moving said shaft toward the brush blank, a plunger mounted in stationary position in alignment with the shaft in its final place, means for positively forcing said plunger forward against the end of said shaft to force the tuft of bristles into the brush, and yielding means for drawing the shaft back when the frame moves away from its tuft setting position.

34. In a tuft setting mechanism the combination of means for supporting a brush blank having a socket therein, a frame having a pair of jaws thereon for conveying a tuft of bristles into axial alignment with said socket, a shaft supported on said frame on which said jaws are supported, means whereby as said frame is moved toward a position for setting the bristles said shaft will be moved toward the brush blank, a plunger mounted in stationary position in alignment with the shaft in its final place, means for positively forcing said plunger forward against the end of said shaft to force the tuft of bristles into the brush, and means for moving said brush supporting means to control the point at which the tuft of bristles will be applied to the brush blank.

35. A bristle holding device for a brush making machine comprising two relatively movable jaw plates movable to a position in which they are parallel but spaced apart, each having a curved edge, said edges extending from them in opposite directions and in each case toward the other jaw plate and into contact therewith to produce a long passage between them to hold a tuft of bristles with its axis parallel with the planes of said jaw plates.

36. A bristle holding device for a brush making machine comprising two relatively movable jaw plates spaced apart, having edges extending from them in opposite directions and in each case toward the other jaw plate and into contact therewith to produce a long passage between them to hold a tuft of bristles with its axis parallel with the planes of said jaw plates.

37. In a brush making machine, the combination of a transferring mechanism comprising a movable frame, tuft holding jaws thereon and means for moving said jaws longitudinally when the frame moves to its setting position, with a brush turret for supporting the brush blanks, and means for moving said turret up and down.

38. In a brush making machine, the combination of a transferring mechanism comprising a frame movable to a tuft setting position, a shaft on said frame having tuft holding jaws thereon, means for moving said shaft longitudinally when the frame moves to its setting position, a brush turret for supporting the brush blanks, means for moving said turret up and down, means for moving the turret longitudinally, and means for intermittently rotating the turret.

39. In a brush making machine, the combination of a frame, a turret for holding brush backs or the like movably mounted on said frame, means for holding brush blanks horizontally on opposite sides of the turret, means for periodically moving said frame up and down, means for intermittently moving said turret longitudinally on the frame, means for controlling said two means to move each brush back first successively into three positions crosswise, then to restore it to its first crosswise position and shift it longitudinally to a new position and for repeating said operations, and means for setting a tuft in the brush blank in each position.

40. In a brush making machine, the combination of a frame, a turret movably mounted on said frame, means for holding brush blanks on opposite sides of the turret, means for periodically moving said frame up and down, means for intermittently moving said turret longitudinally on the frame, means for controlling said two means to move each brush blank first successively into three positions crosswise, then to restore it to its first crosswise position and shift it longitudinally to a new position and for repeating said operations, means for setting a tuft in the brush blank in each position, and means whereby upon the completion of the setting of tufts in the brush blank said brush turret will be rotated throughout a part of a revolution to bring new blanks into position.

41. In a brush making machine, the combination of an oscillatable frame, a brush supporting device carried by said frame, tuft setting mechanism mounted at the side of said brush supporting device, means for operating the tuft setting mechanisms, a shaft, a ratchet wheel on the shaft, means for operating said ratchet wheel by a step by step motion to turn the shaft, and means on said shaft for intermittently raising and lowering said frame and for advancing the brush supporting device longitudinally by step by step motion.

42. In a brush making machine, the combination of a frame, a turret movably mounted on said frame, means for holding brush blanks on opposite sides of the turret, means for periodically moving said frame up and down, means for intermittently moving said turret longitudinally on the frame, means for controlling said two means to move each brush blank first successively into three positions crosswise, then to restore it to its first crosswise position and shift it longitudinally to a new position and for repeating said operations, means for setting a tuft in the brush blank in each position, and means whereby upon the completion of the setting of tufts in the brush blank said brush turret will be rotated throughout a part of a revolution to bring new blanks into position.

43. In a brush making machine, the combination of a transferring mechanism comprising a frame movable to a tuft setting position, a shaft on said frame having tuft holding jaws thereon, a brush turret for supporting the brush blanks, means for moving said turret up and down, means for moving the turret longitudinally, and means for intermittently rotating the turret.

44. In a tuft setting mechanism, the combination of means for supporting a brush blank having a socket therein, a frame having a pair of jaws mounted thereon for gripping a tuft of bristles adjacent to the end of a metallic cup forming the butt thereof, said frame being movable sideways for moving the cup into axial alignment with said socket, and means for thereafter positively forcing said jaws forward against the end of said cup to force the tuft of bristles into the brush blank.

45. A transferring mechanism for a brush machine comprising a movable frame, a jaw movably carried by said frame, a second jaw thereon adapted to cooperate with the first named jaw, means for moving the second jaw when the frame approaches receiving position, means for yieldingly closing said jaw when the frame is in receiving position, and means for positively forcing the jaws back when the frame moves away from delivering position.

46. In a transferring mechanism for a brush making machine the combination of a swinging frame, a pair of wide jaws carried by said frame for engaging a flaring tuft of bristles and keeping them together, each jaw having a flat body and a curved end, said curved ends being adapted to come together, each to engage the other flat body and close about the tuft of bristles.

47. In a transferring mechanism for a brush machine, the combination of an oscillatable frame, a pair of jaws carried by said frame for gripping a tuft of bristles and holding the same, one of said jaws being mounted to swing on an axis located parallel with the length of the bristles toward and from the other jaw as the frame moves, and means for controlling the swinging of said jaw on its axis.

48. In a brush making machine, the combination of a turret, means for intermittently rotating the turret, a plurality of heads on the turret, each having a chuck for holding a wire centrally therein, means for feeding a wire through each chuck when in one position, means for stopping the wire and limiting its position when the feeding operation is complete so that the wire will project beyond the end of the head and the end of the turret, means for shaping the end of the wire at the next position of the head, means for drilling a hole centrally into the end of the wire, means for completing the hole at the next position of the head, means for inserting a tuft of bristles into the hole at the next station, means for then nicking the wire to force projections inwardly for the purpose of holding the tuft of bristles therein, means whereby at the next position the shaped end of the wire is swedged to force it inwardly around the bristles and permanently hold them in position, means for cutting off the end of the wire with its enclosed bristles at the next station and shaping the end of the cut off cup, and means for rotating the heads during the drilling, cutting off, and shaping operations.

49. In a tuft making machine, the combination of a plurality of heads, each having a chuck for holding a wire centrally therein, means for moving the heads intermittently, means for feeding a wire through each chuck when in one position, means for stopping the wire and limiting its position when the feeding operation is completed, means for shaping the end of the wire at the next position of the head, means for simultaneously drilling a hole centrally into the end of the wire, means for completing the hole at the next position of the head, means for inserting a tuft of bristles, means for then shaping the wire to force it inwardly for the purpose of holding the tuft of bristles therein, means whereby at the next position the shaped end of the wire is shaped to force it inwardly around the bristles and permanently hold them in position, and means for rotating the wire during the last named operation.

50. In a brush making machine, the combination of a turret, means for intermittently rotating the turret, a plurality of heads on the turret, each having a chuck for holding a wire centrally therein, means for feeding a wire through each chuck when in one position, means for stopping the wire and limiting its position when the feeding operation is complete so that the wire will project beyond the end of the head and the end of the turret, means for rotating each head, means for drilling a hole centrally into the end of the wire, means for completing the hole at the next position of the head, means for inserting a tuft of bristles into the hole, means for then shaping the wire to force it inwardly for the purpose of holding the tuft of bristles therein, and means whereby the head is held against rotating during the last named operation.

51. In a brush making machine, the combination of a support, a plurality of heads on the support, each for holding a wire, means for rotating each head on its own axis, means for forming a hole centrally in the end of the wire held by a head, means for thereafter completing the hole, means for thereafter inserting a tuft of bristles into the hole, and means whereby each head is held in stationary position during the inserting of the tufts.

52. In a brush making machine, the commination of an indexing turret having a plurality of heads carried thereby, and adapted to support as many wires as there are heads on the turret, means whereby when each head comes to a certain position its grip on the wire is released and the wire held by that head is cut off and fed forward so as to project through the head, means for boring into the projecting end of the wire as it moves around, means for inserting a tuft of bristles axially into the bore thereof, and means for cutting off the end of the wire beyond the base of said tuft.

53. In a brush making machine, the combination of a main frame, a rotatable turret thereon having a plurality of heads, each head having means for gripping a wire and movable successively to different positions, means for indexing said turret around intermittently, a wire supporting reel having means for supporting a plurality of wires one for each head, said reel being capable of rotating with the turret, means for feeding a wire forward in each head when it reaches one of its positions, means for boring into the ends of the wires supported by said heads, and means located on said main frame beyond said turret for inserting a tuft of bristles into the end of each wire in regular order.

54. In a brush making machine, the combination of a plurality of heads movable successively into different positions, each head having means for gripping a wire, means for feeding a wire forward in each head, when it reaches one of its positions, means for boring out the ends of the wires supported by said heads, means for inserting a tuft of bristles into the end of each wire in regular order, and a cutting off device located in position to cut off the wire beyond the bottom of the bore.

55. In a brush making machine, the combination of means for supporting a solid wire, means for boring into its end to form a cup at the end of the wire, means timed to operate after the boring action for feeding a tuft of bristles into the cup, means for then moving the cup to a new position means for shaping the cup to clamp the bristles therein, and means for cutting the cup off the wire at a point beyond the bottom of the bore.

In testimony whereof I have hereunto set my hand.

ARTHUR W. LE BOEUF